United States Patent [19]
Jäck et al.

[11] Patent Number: 5,182,428
[45] Date of Patent: Jan. 26, 1993

[54] METHOD AND APPARATUS FOR REMOVING TARGET SECTIONS OF SHEET METAL FROM A CONTINUOUS COIL AND PLACING THOSE SECTIONS IN SEPARATE CONTINUOUS COILS IN A CONTINUOUS OPERATION

[75] Inventors: Kurt K. J. Jäck, Aulendorf; Gerhard G. A. Alber, Ravensburg, Fed. Rep. of Germany

[73] Assignee: Thyssen Industries AG Maschinenbau, Fed. Rep. of Germany

[21] Appl. No.: 667,752

[22] Filed: Mar. 11, 1991

[30] Foreign Application Priority Data

Apr. 6, 1990 [EP] European Pat. Off. ........ 90106963.6

[51] Int. Cl.⁵ .................... B23K 26/00; B21D 39/03
[52] U.S. Cl. .................... 219/121.63; 219/121.64; 219/121.67; 228/5.7; 228/49.4; 228/170
[58] Field of Search ............ 219/121.63, 121.64, 219/121.65, 121.66, 121.67, 121.68, 121.69, 121.83, 57, 58, 101, 104; 228/5.7, 44.3, 49.4, 102, 103, 104, 144, 164, 170, 171, 172, 173.6; 156/157, 159, 380.9; 29/33 B, 466, 467

[56] References Cited

U.S. PATENT DOCUMENTS

| | | | |
|---|---|---|---|
| 4,142,237 | 2/1979 | Yamasaki | 228/5.7 |
| 4,161,808 | 7/1979 | Wittstock | 219/121.67 |
| 4,840,303 | 6/1989 | Fujii et al. | 228/49.4 |

FOREIGN PATENT DOCUMENTS

| | | | |
|---|---|---|---|
| 0151848 | 8/1985 | European Pat. Off. | |
| 0302954 | 2/1989 | European Pat. Off. | |
| 0326994 | 8/1989 | European Pat. Off. | |
| 396498 | 11/1990 | European Pat. Off. | 228/170 |
| 2561951 | 10/1985 | France | 228/172 |
| 63-177984 | 7/1988 | Japan | 228/170 |

*Primary Examiner*—Geoffrey S. Evans
*Attorney, Agent, or Firm*—Arnold, White & Durkee

[57] ABSTRACT

A method and apparatus for selectively removing target sections from a continuous coil of sheet metal and connecting those sections to one or more sheet metal take-up winders. Depending upon the thicknesses or amount of defects in each detected target section, the corresponding target can be connected to an appropriate continuous sheet metal winder which therein contains a specific classification of sheet metal. Defects, such as errant sheet metal thicknesses, can be removed from a continuous coil and placed on a raw sheet metal coil separate from a finished sheet metal coil containing substantially no defects.

32 Claims, 23 Drawing Sheets

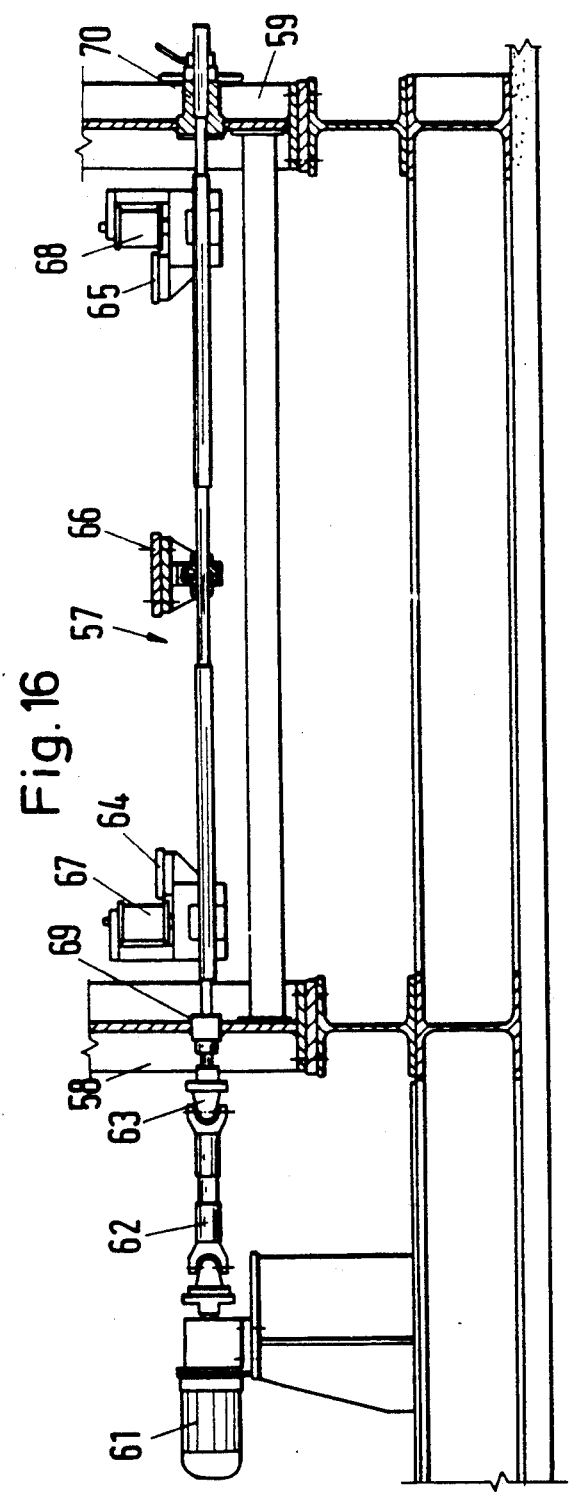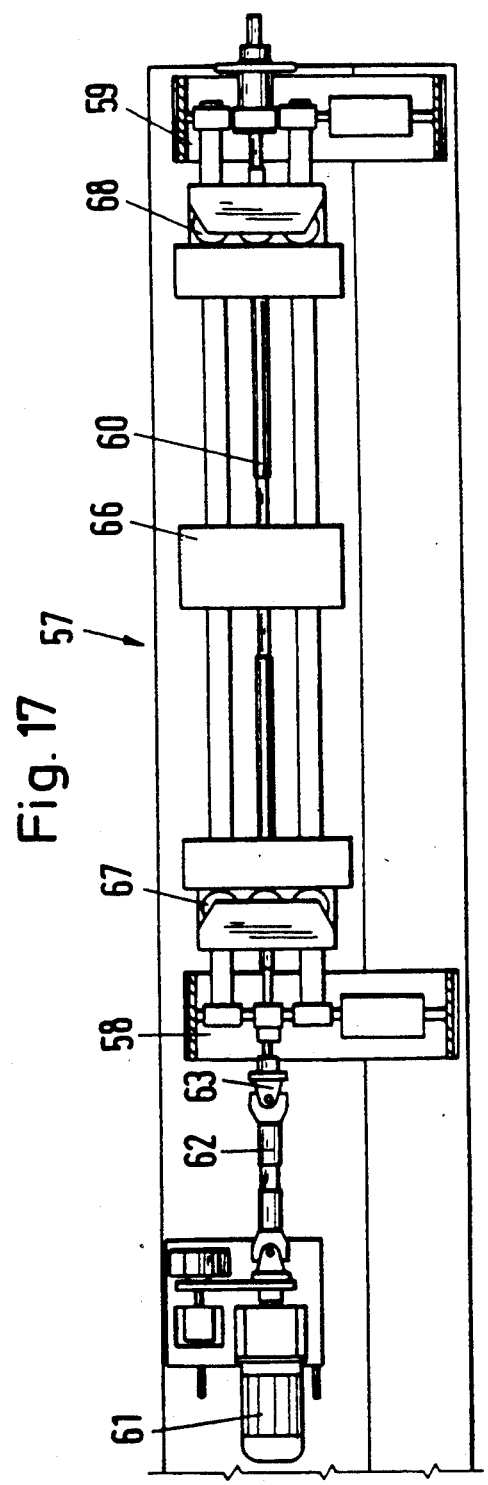

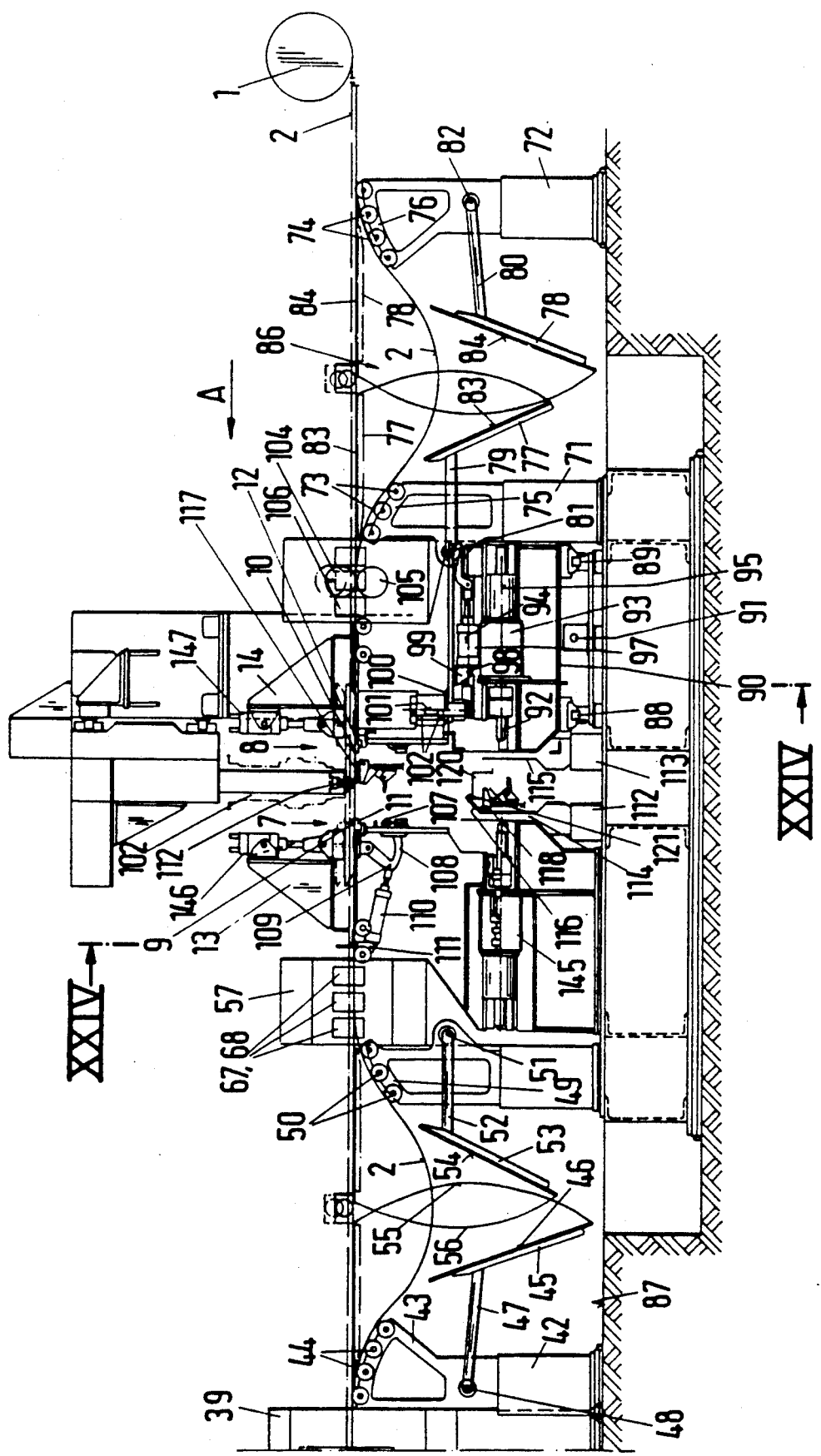

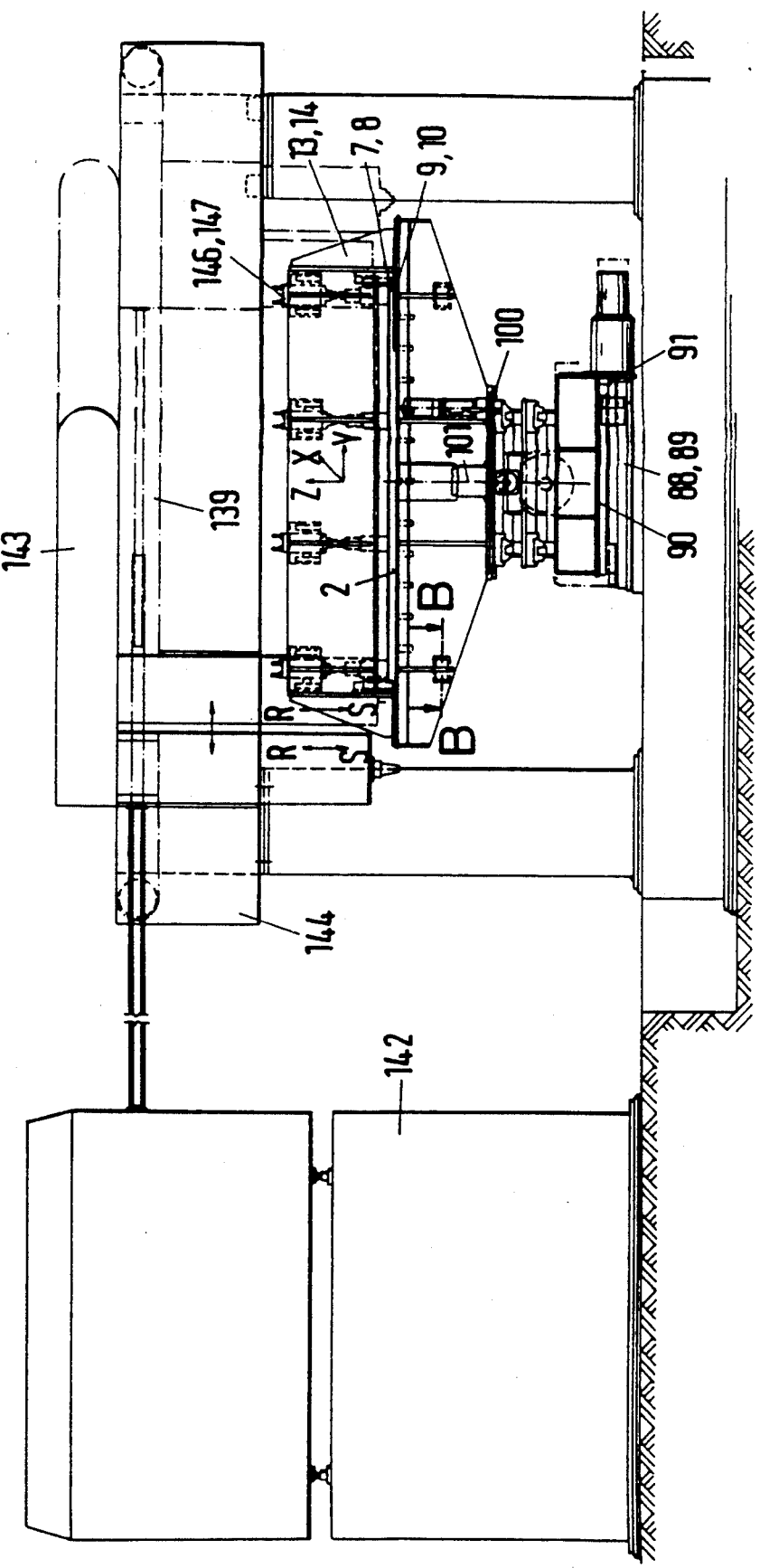

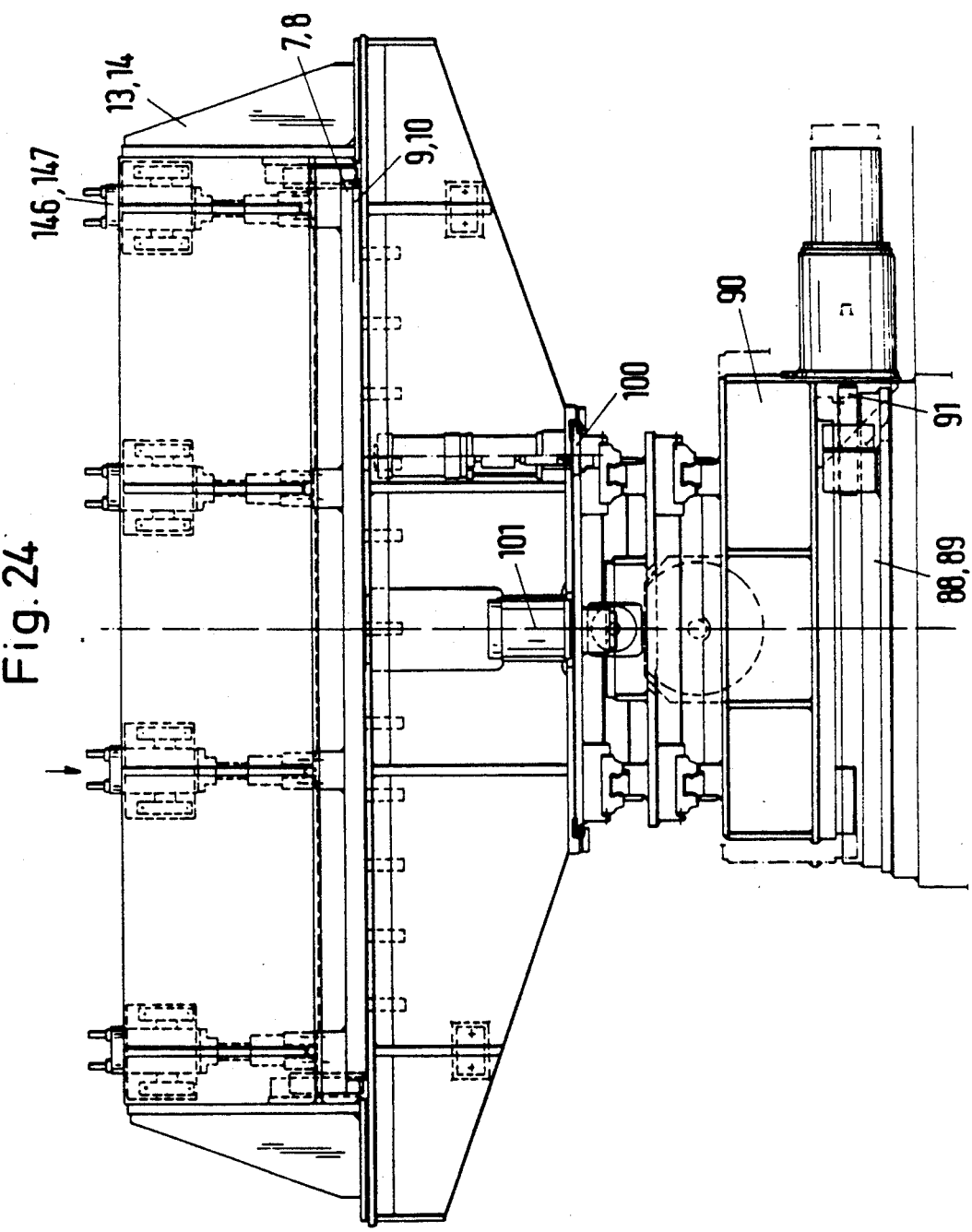

METHOD AND APPARATUS FOR REMOVING TARGET SECTIONS OF SHEET METAL FROM A CONTINUOUS COIL AND PLACING THOSE SECTIONS IN SEPARATE CONTINUOUS COILS IN A CONTINUOUS OPERATION

BACKGROUND OF THE INVENTION

1. Field of the Invention

This invention relates a method and apparatus for selectively removing target sections of sheet metal from a continuous coil of sheet metal and placing those sections in one or more separate continuous coils of target sheet metal. In particular, the method comprises a cutting laser beam for removing target sections from a continuous coil and a welding laser beam for connecting target sections on one or more separate continuous coils. Cutting and welding procedures take place on an apparatus which aligns both the sheet metal and the cutting and welding laser beams with respect to the sheet metal. The present invention also relates to an apparatus which achieves both cutting and welding of sheet metal drawn from a continuous band of sheet metal in a continuous operation.

2. Description of the Relevant Art

In an industrial setting such as the automotive industry, automotive bodies are often made from a continuous coil of sheet metal having even thickness throughout. Sheet metal drawn from a sheet metal coil is cut and welded at specific locations to define an automotive body. It is important that the sheet metal band drawn from the coil be of uniform thickness within a specific tolerance range. Thus, a need arises for producing sheet metal bands of uniform thickness to meet the quality standards typically found in commercial or industrial applications such as the automotive industry. However, a recurring problem exists in that sheet metal bands coming from the manufacturer do not have the required uniformity of thickness. Rather than rejecting the entire coil, a need arises for selectively removing target sections which have defects such as errant thicknesses while still maintaining a continuous coil. Typical cutting and welding devices cannot interrupt a coil at the defective target location and cut the defective section from the coil and then subsequently weld the coil ends back together again while always maintaining uniform thicknesses within the finished coil product, and especially at the weld regions.

Conventional devices and methods not only cannot selectively remove defective regions from a continuous coil and subsequently evenly and uniformly join the coil back together again, but also conventional welding techniques do not provide a uniform weld location in the finished sheet metal product. Welding techniques typically include flash-butt welding, roll welding, clinching and plasma welding. Flash-butt welding requires the ends of each sheet metal portion be butt-joined to each other and resistance welded in the butt seam. Roll welding includes using roll welding electrons within the seam. Clinching generally embosses or presses together the ends of the sheet metal after they have been slightly overlapped. Still further, plasma jet welding also requires a slight seam overlap and higher heat introduction into the welded seam. Currently, all of the above methods demonstrate an exaggeration or bulge within this seam region. The overlap caused by clinching or plasma jet welding places an exaggeration in thickness at the seam location inappropriate for high quality, close tolerance sheet metal thicknesses needed for many industrial applications such as the automotive industry. The seam exaggerations not only cause inappropriate thickness extremes within the finished, welded product, but also results in off-centered coils of uneven sheet metal thicknesses. Although butt-laser welding procedures show promise, such as those discussed in European Patent No. EP-OS O 151 848, the disclosure of which is incorporated herein by reference, conventional machines needed for successful butt-welding procedures are expensive and difficult to manufacture.

In order to achieve a successful, even butt weld, it is important that the ends of the joined sheet metal be in precise alignment with each other. Conventional machines cannot achieve the needed amount of alignment precision in order to make butt welding commercially successful. Furthermore, if the sheet metals used are relatively thin, the butting together of the ends of the thin sheet metal may cause the ends to slightly buckle thereby causing potential seam exaggeration problems. Therefore, not only is it important that the ends be precisely aligned with one another, but the ends must be brought together with enough precision so that when they butt they do not buckle: The butt seam must also be deep-drawable and be made with a high precision and permanent constant quality. The cutting and welding operations must also be adaptable to a wide variety of sheet metal thicknesses and compositions. While butt-welding appears to have many of the advantages necessary for achieving uniform weld thickness throughout the sheet metal coil, conventional devices cannot incorporate both cutting and butt welding in an apparatus capable of achieving the necessary precision and adaptability required for current industrial settings.

SUMMARY OF THE INVENTION

The problems outlined above are in large part solved by the method and apparatus of the present invention. That is, the present invention achieves laser cutting of target sections from the sheet metal and butt-welding the ends of the cut sheet metal in a precise manner without any displacements, lateral projections (seam exaggerations), or buckling of the finished product. The method and apparatus of the present invention are particularly appropriate for reworking sheet metal coils containing defects or inappropriate thickness regions. Reworking is achieved by cutting out the target section and placing that section in continuous fashion on one or more coils spaced from the original continuous coil. Furthermore, the reworked original coil is welded at each location where the target section is removed in continuous fashion and with uniform and precise alignment at the weld seam.

Broadly speaking, the present invention contemplates a method for selectively removing target sections of sheet metal from a continuous coil of sheet metal and placing those sections in a separate continuous coil of sheet metal. The method includes drawing the sheet metal from the coil along an elongated table and onto a first sheet metal winder. Target sections are then sensed within the drawn sheet metal and are cut from the sheet metal at a region immediately prior to the target section. The cut produces a first end of the sheet metal attached to the first winder and a second end of the sheet metal attached to the coil. Further winding of the first winder causes the first end to be partially withdrawn from the table. A second sheet metal winder is provided which contains the continuous coil of target sheet metal sections and having a third end thereof. The second sheet metal winder is unwound to advance the third end onto the table and in close, somewhat precise alignment with the second end. Welding is then achieved at the seam between the second and third ends, thereafter allowing winding of the second sheet metal winder to draw the target section from the coil and onto the second sheet metal winder as a continuous coil of target sheet metal.

In a preferred embodiment of the present invention, the cutting step includes a movable cutting laser and at least two clamping jaws attached to the table on opposite sides of the laser along the longitudinal axis of the sheet metal. The pair of jaws are closed at a region immediately prior to the target region and at least one jaw on one side of the laser is opened after the cutting step to allow removal of the sheet metal onto the first winder. The welding step also includes a movable welding laser, either the same laser as the cutting laser or a separate laser, and at least two clamping jaws attached to the table on opposite sides of the welding laser along the longitudinal axis of the sheet metal. At least one jaw is closed onto the second end and at least one other jaw onto the third end after the unwinding step. Next, the welding step includes placing the second and third ends in close proximity and in alignment with each other and, subsequently, pivotally placing a copper plate on one side of the second and third ends such that the second and third ends reside between the welding laser and the copper plate. After the welding step is completed, both clamping jaws are opened.

The step of placing the second and third ends in close proximity includes, in a preferred embodiment, moving the second and third ends toward each other along the longitudinal axis of the sheet metal. Alternatively, the placing step may include moving both the second and third ends toward one another and pivoting the clamping jaws with respect to one another around an axis orthogonal to the sheet metal surface.

In another aspect of the preferred embodiment, the unwinding step includes a cutting laser and a sheet metal shunt attached to the table between the laser and the first winder for extending the advancing third end toward the second end. The third end may be shaped with a cutting laser to match or be brought into substantial conformity with the geometric shape and alignment of the second end. Shaping allows for substantially precise alignment between the ends of the sheet metal at the seam to allow for close butting between the second end and the shaped third end against one another and in alignment therebetween immediately before the welding step occurs. Further, it should be noted that for this embodiment, the shaping step is carried forth by spindle drives attached to the table and arranged for receiving the sheet metal and target sheet metal, wherein the spindle drives can be orthogonally and pivotally adjusted to longitudinally align the second and third ends. Furthermore, the cutting laser is used for cutting regions of the slightly extended third end which is in misalignment with the second end and removing those cut regions by a conveyor arranged underneath the cutting laser. The present invention also contemplates brushing both sides of the welding joint formed between the second and third ends to maintain uniform thickness throughout the target sheet metal. Punching or marking at various points on the target sheet metal can also be carried forth.

It should be further noted that the preferred embodiment also includes a method for selectively separating, in a continuous operation, target sections from a continuous coil of original sheet metal and connecting those sections onto separate continuous coils of finished sheet metal or raw sheet metal. This method includes sensing a target section and cutting that section at a region immediately prior to that section. The original sheet metal having the cut target section is then welded onto the ends of a continuous coil of raw sheet metal. Further sensing of subsequent target sections having thicknesses within a desired thickness range are then carried forth. Next, the method includes repeating the steps of cutting the original sheet metal at a region immediately before the subsequent target section, drawing the raw sheet metal onto the second winder, unwinding the first sheet metal winder to advance the finished sheet metal toward the original sheet metal, welding the finished sheet metal to the target section and winding the target section onto the first sheet metal winder as a continuous coil of finished sheet metal. Thus, the present invention contemplates a method for placing target sections onto a raw sheet metal winder and further placing subsequent target sections (dissimilar from the original target section) onto a finished sheet metal winder. The finished sheet metal winder includes target sections having thicknesses within a desired range, wherein the raw sheet metal winder includes target sections having thicknesses outside the thickness range. The "outside-the-specification" (nonuniform) target sections are placed in a continuous coil of raw sheet metal while the "inside-the-specification" (uniform) target sections are placed in a continuous coil of finished sheet metal. The finished sheet metal, having uniform butt-welded seams, represents a continuous coil of high quality sheet metal suitable for industrial applications requiring a continuous form of sheet metal having uniform thickness.

The present invention also contemplates an apparatus for selectively separating target sections from a continuous coil of original sheet metal and connecting those sections onto separate coils of target sheet metal. The apparatus includes an original coil containing original sheet metal, an elongated table spaced from the original coil for receiving the sheet metal drawn from the coil and a pair of clamping jaws attached to the table and capable of clamping onto the drawn sheet metal. A sensor is placed along the table for detecting target sections within the drawn sheet metal. Means is mounted on the table between the pair of jaws for cutting the sheet metal immediately prior to the target section. A first winder is spaced from the original coil for drawing the cut sheet metal, and a second winder is spaced from the original coil and the first winder for containing non-uniform, continuous target sections. Means are mounted on the table between the clamping jaws for joining the target sections to the detected target section on the original sheet metal and means are provided for winding, upon the second winder, the detected target section.

In one aspect of the preferred apparatus, the cutting and joining means comprises a laser. The cutting laser is movable in an orthogonal direction with respect to the longitudinal axis of the sheet metal. The joining means may also comprise a laser which is pivotable around an axis which is orthogonal to the horizontal plane of the sheet metal.

In another aspect of the preferred invention, each clamping jaw may comprise means for moving one clamping jaw toward the other or for moving one clamping jaw away from the other. If one clamping jaw is moved away from the other, the table includes a supporting trough pivotable to receive downward bending of the sheet metal in response to the away movement of said clamping jaws. Downward movement of the trough allows for a wide bend of the sheet metal, thereby substantially preventing buckling of the ends as they are butted together during the welding step.

In still another aspect of the preferred embodiment, the apparatus further includes means for shaping the end of the continuous target section to match the end of the detected target section. Furthermore, the apparatus includes a shunting means mounted on the cable between the cutting means and the first winder, between the joining means and the second winder for directing continuous target sections to the detected target sections on the original sheet metal. Lateral guiding rollers are spaced along the table and movable to laterally adjust the longitudinal alignment of the sheet metal to accommodate sheet metal of different widths and longitudinal displacement. Brushes may be also be provided along the table on both sides of the sheet metal between the cutting means and the first winder, between the joining means and second winder.

Furthermore, it is contemplated in the present invention to move the ends of the sheet metal in a continuous direction after they have been cut. It is also possible to move the ends together in a direction opposite to the continuous direction. By independently moving each end in either a continuous direction or a direction opposite thereto, the ends can be exactly adjusted and aligned with one another without causing buckling when they are brought close together in preparation for a butt weld. Very thin sheet metals having a thickness of, for example, 0.18 mm can be butt welded by longitudinally moving the ends relative to one another. Still further, sheet metals of almost any thickness, for example, in the range of 0.18 to 8.0 mm can be cut as well as laser beam welded according to the present invention.

Not only can the present method and appartus longitudinally draw cut ends toward each or away from each other, or move the ends in longitudinal alignment with one another, but can also pivot the ends to a specific angular range so that they may be welded together in a continuous direction taking into account pivotal misalignment of the ends. The invention utilizes suitable servo motors for moving fixed or clamped ends in either a longitudinal or pivotal direction wherein the clearance measurements between the butted ends is monitored by camera or any other suitable clearance measurement process.

BRIEF DESCRIPTION OF DRAWINGS

This invention will further be illustrated with reference to the appended drawings which illustrate particular embodiments of the apparatus in accordance with this invention.

FIG. 16 is a side-view of a guidance unit;

FIG. 17 is a top-plan view of the guidance unit of FIG. 16;

FIG. 18a is a front view of the clamping jaws, hinged table surface, sheet metal-loop, side guiding mechanism, laser cutting and welding mechanism, spindle drives and unwinding mechanism of the present invention;

FIG. 22 is an enlarged sectional view of FIG. 18a;

FIG. 23 is a plan view of the beam-guiding system or the laser beam welding device of the present invention; and FIG. 24 is a side sectional view along line XXIV—XXIV in FIG. 18a.

DESCRIPTION OF THE PREFERRED EMBODIMENTS

Figure 1:
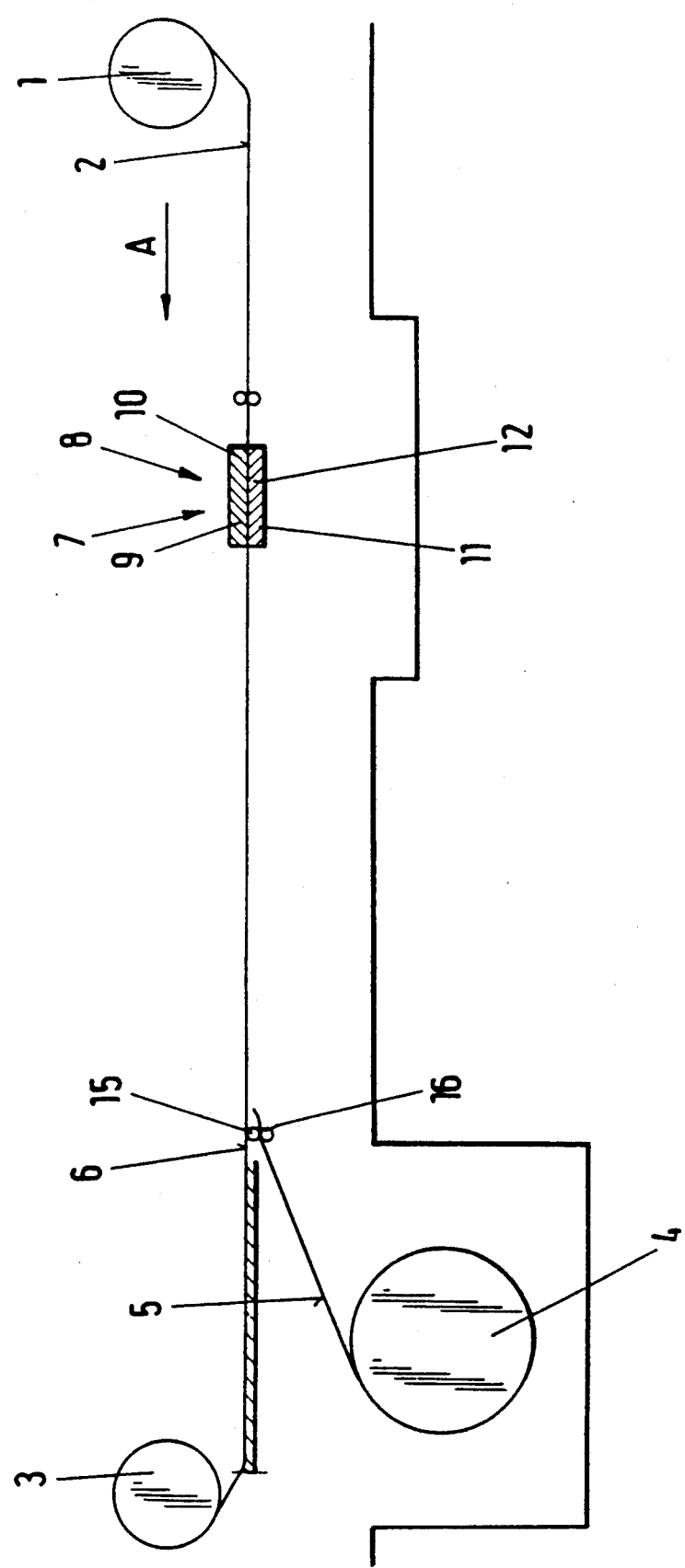
FIG. 1 is a schematic side-view of finished sheet metal being drawn into a winder.

Turning to the drawings, an apparatus is shown in schematic form in FIG. 1 having sheet metal band 2 advanced in the direction of A from an unwinding mechanism 1 and onto a finished sheet metal winder 3. A raw sheet metal winder 4 is displaced from finished winder 3 for receiving raw sheet metal 5. Raw sheet metal 5 contains a continuous coil of target material, which, for example, does not meet thickness specifications or has other defects contained therein. Thus, finished winder 3 contains a continuous coil of finished sheet metal 6 having target material which, for example, meets the specifications for the particular desired industrial application. Finished sheet metal is a continuous coil of even thickness sheet metal 6 having substantially few defects while, conversely, raw sheet metal 5 is a continuous coil of substantially uneven sheet metal with defects.

The apparatus shown in FIG. 1 according to the present invention offers the advantage of being able to transfer sheet metal band 2 to either raw sheet metal winder 4 or finished sheet metal winder 3 depending upon whether or not the sheet metal is defective or is not defective. The device and method which allows drawing of either finished sheet metal 6 or raw sheet metal 5 is discussed below. Generally speaking, the apparatus according to the present invention achieves the transferral from, for example, winding on to raw sheet metal winder 4 to winding on to finished sheet metal winder 3 by cutting sheet metal band 2 and drawing the cut sheet metal partially onto raw sheet metal winder 4 thereby leaving a path in which unwinding finished sheet metal winder 3 and advancing finished sheet metal 6 can be drawn in a direction opposite of A toward sheet metal band 2. The same applies if the transfer occurs from winding on to finished sheet metal winder 3 to winding on to raw sheet metal winder 4. The welds occurring from a welding laser placed along sheet metal band 2 meet the high standard quality requirements for welds in a car automotive body. Thus, welds produced by the present invention are of uniform thickness throughout finished sheet metal 6 and are suitable for a car body having deep-drawing suitable in a car floor panel or body. The laser beam welding device can be, for example, Trumpf Laser TLF Model No. 1500, 2000, 2500 or 6000 made by Firma Trumpf Laserrechnik, GmbH, Ditzengen, Germany or model designations RS 1200 SM, RS 1700 SM, RS 1700 RF, RS 2500 RF, RS 3000 RF, RS 5000 RF, RS 6000 RF, RS 825, RS 840 or RS 850 available from Firma Rotin Sinar Laser GmbH, Hamburg, Germany. The choice of a specific laser depends upon the metal strip thickness, weld cycle time and desired quality.

As shown in FIG. 1, the present apparatus includes two clamping jaws, pairs 7 and 8, which can be brought together as a single unit. Clamping jaw pairs 7 and 8 comprise an upper clamping jaw 9 and 10 and lower clamping jaw 11 and 12. As will be more clearly shown in FIG. 18a, clamping jaw pairs 7 and 8 respectively are each arranged on gripping yokes 13 and 14, respectively. Yokes 13 and 14 and attached jaws 7 and 8 can be moved in direction A, thus in a continuous direction of sheet metal band 2, or they can be moved opposite to direction A in a continuous fashion. Still further, yokes 13 and 14 can be drawn apart or together to a limited degree and can be fixed in a desired position for proper alignment for attached ends of sheet metal placed within each jaw.

Figure 18:
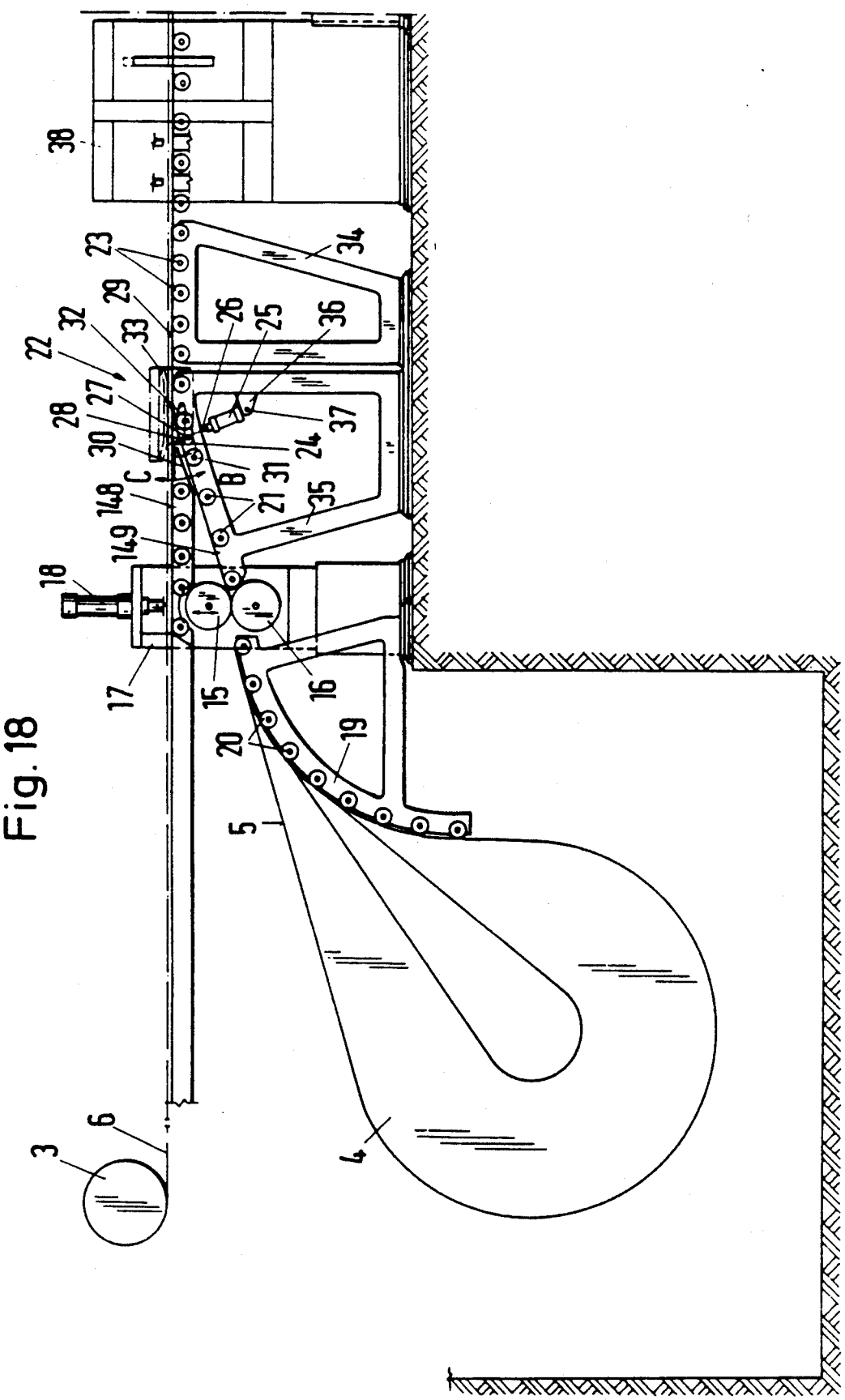
FIG. 18 is a front view of the finished/raw sheet metal winding assembly complete with shunting mechanism.
Figure 19:
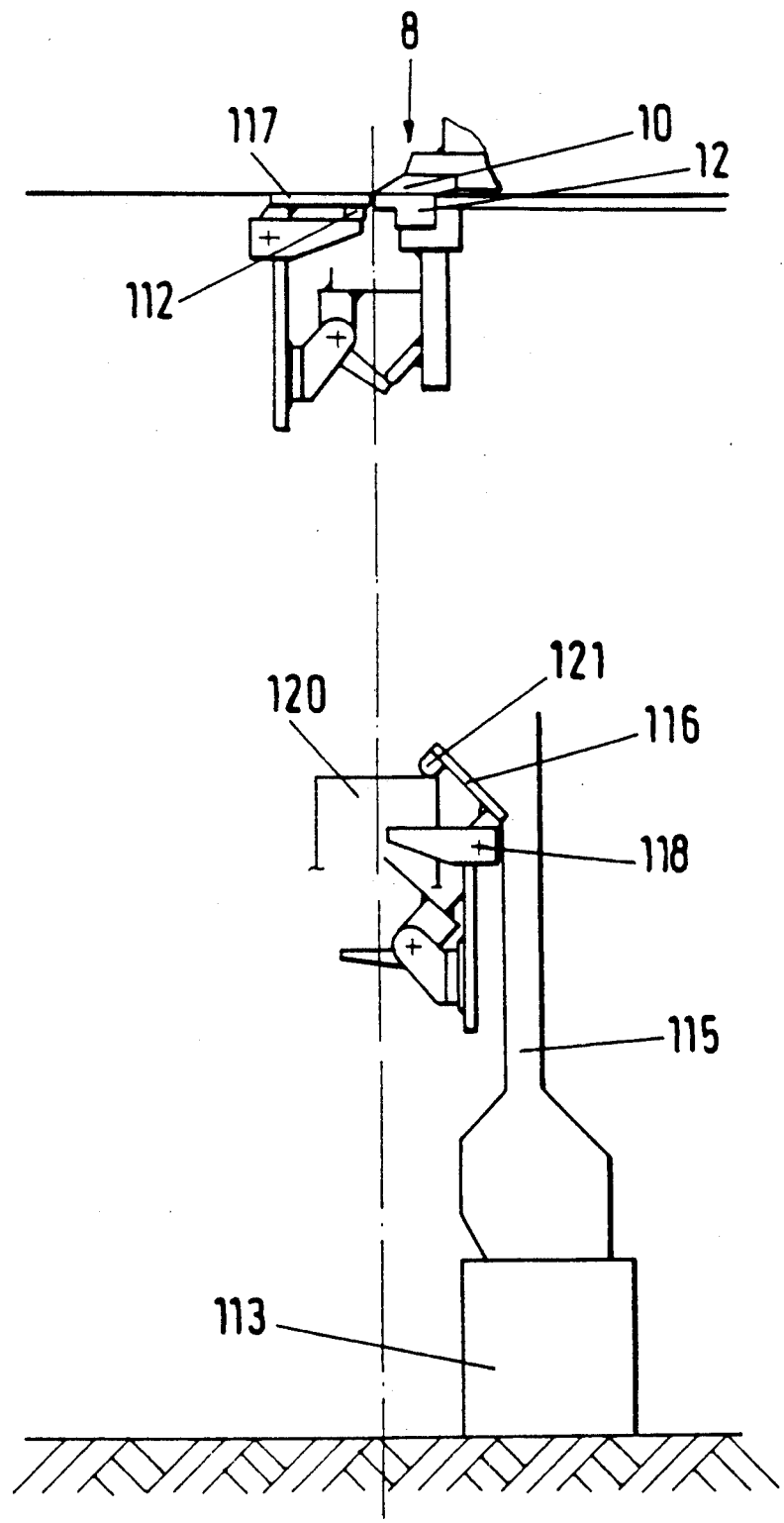
FIG. 19 is a front view of one half of the shaping means by which one end of the sheet metal is cut to accommodate the other end.
Figure 20:
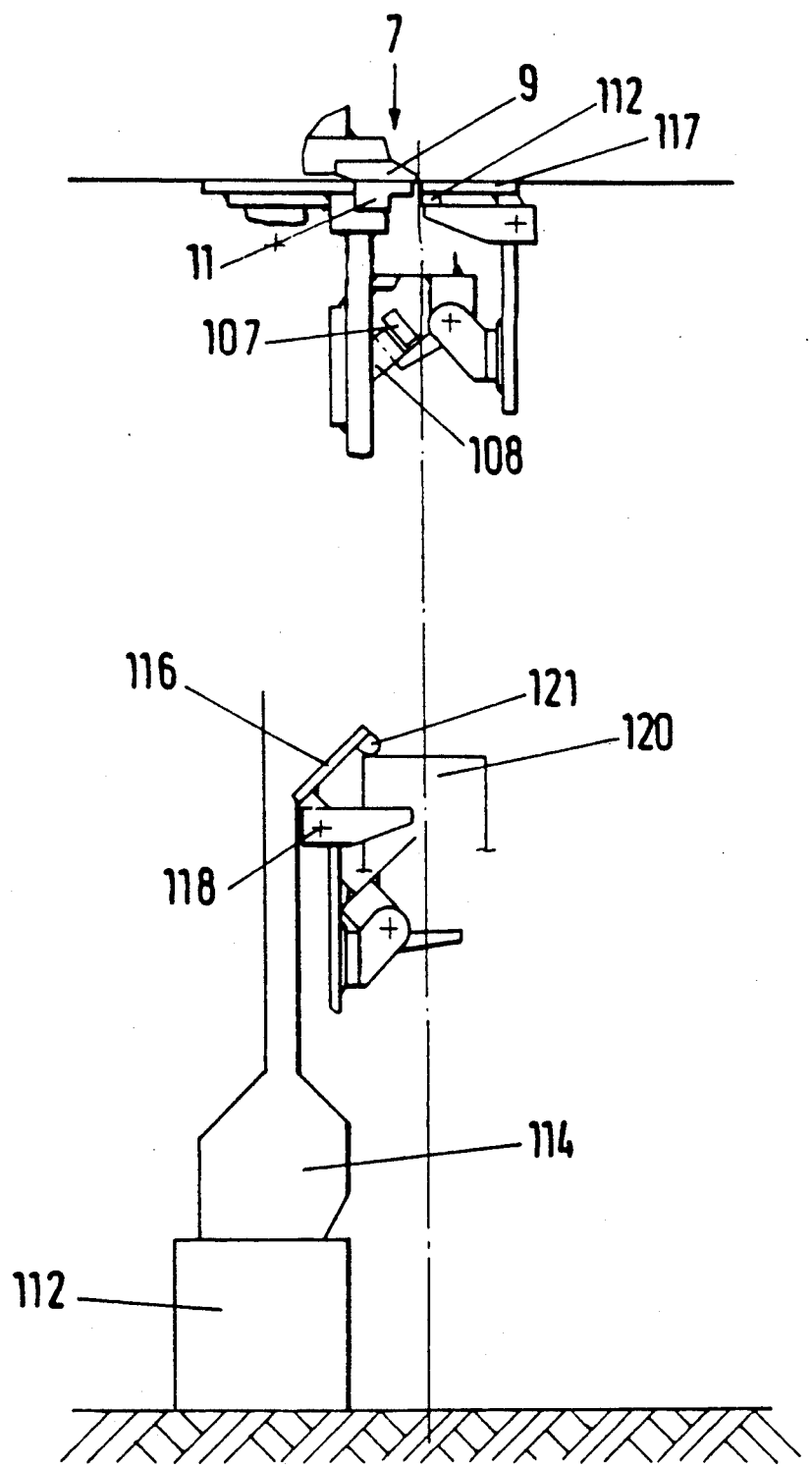
FIG. 20 is a front view of the other half of the shaping means by which one end is cut to accommodate the other end.
Figure 21:
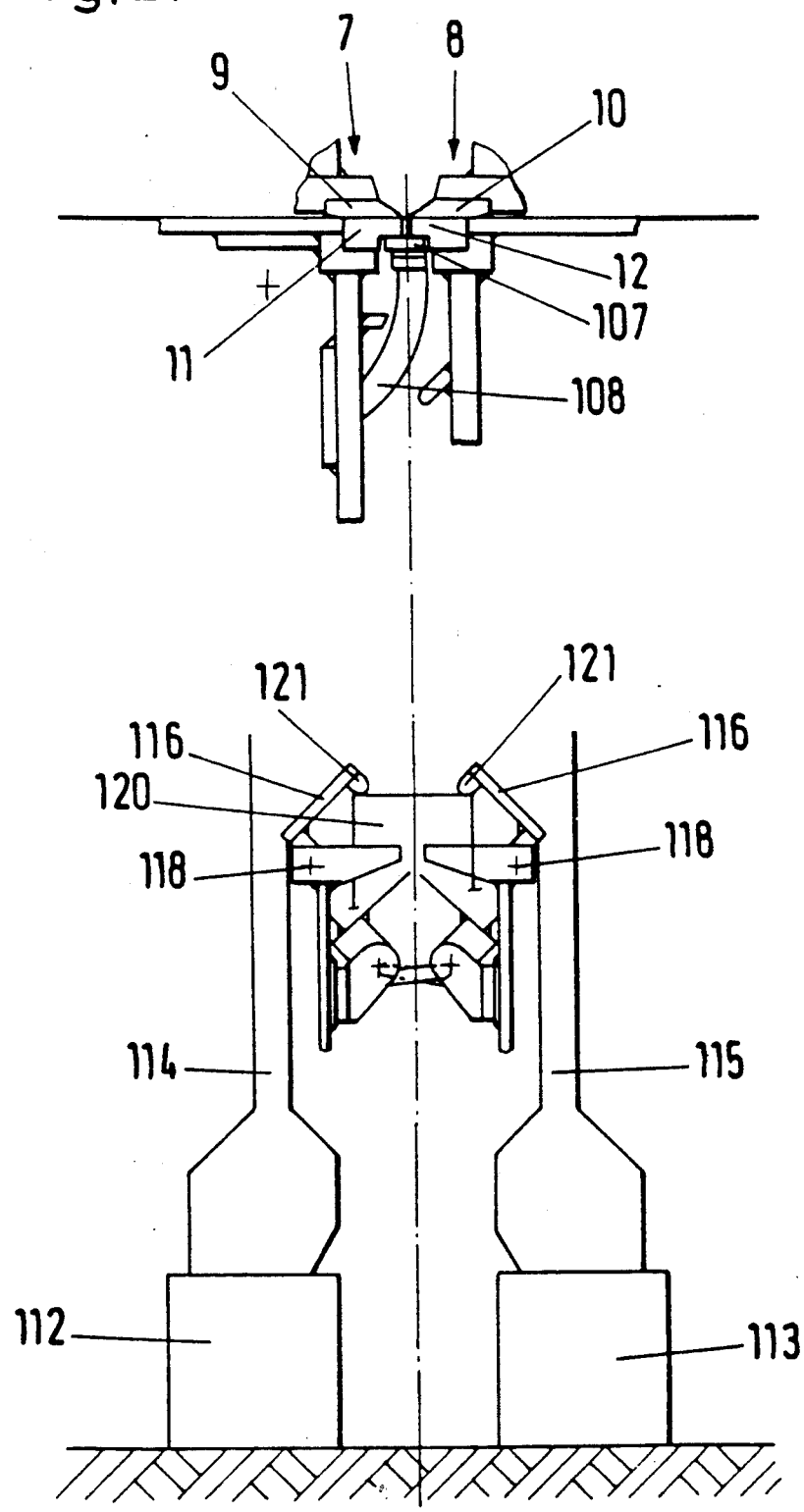
FIG. 21 is a front view of both halves of the shaping means with a curved-end copper backed-up bar.
Figure 22:
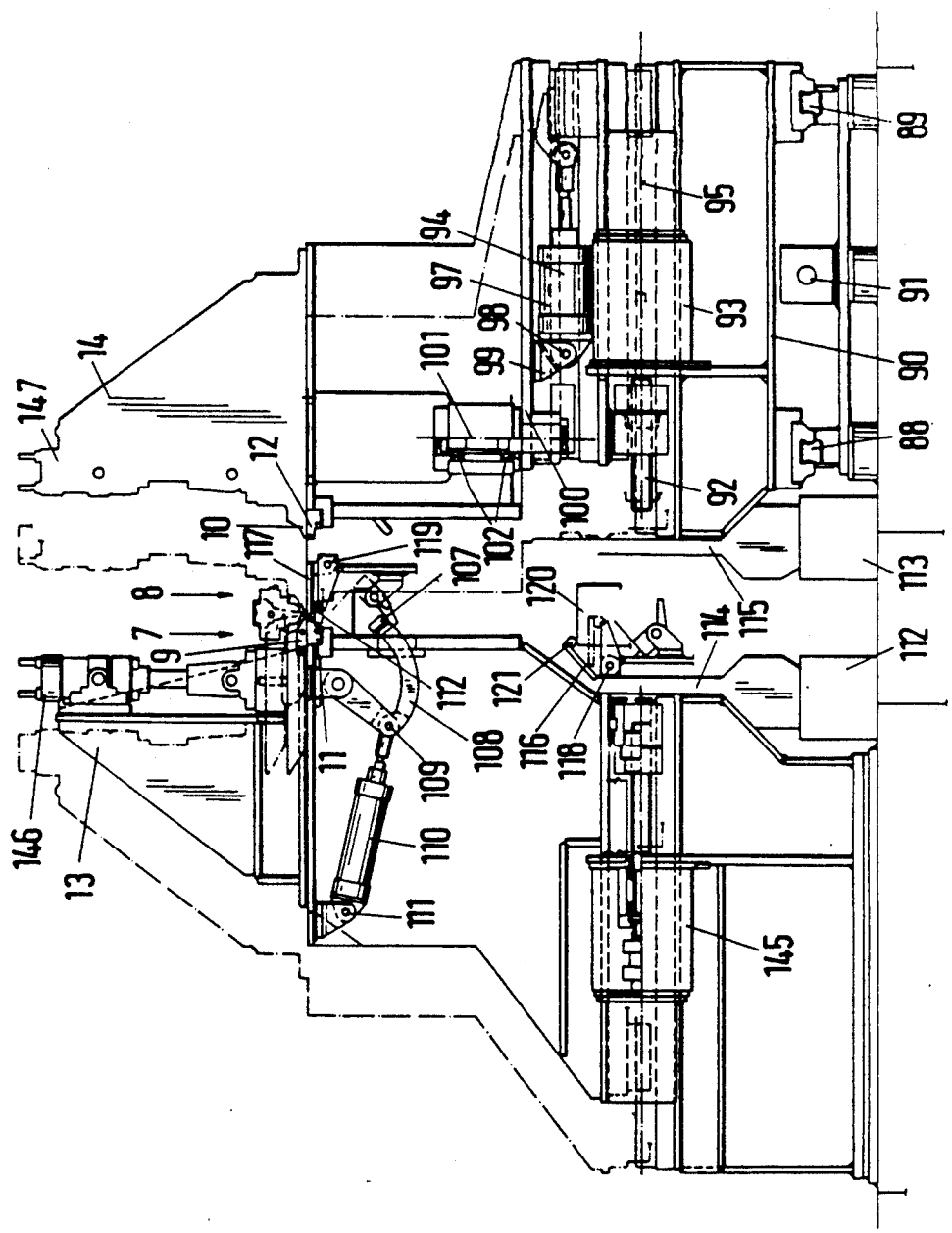

Reference numerals 15 and 16 designate reversing rolls shown in FIGS. 1–13 and 18. Reversing rolls 15 and 16 can be driven in a direction opposite that of direction A to advance raw sheet metal 5 toward sheet metal band 2. As shown in FIG. 18, rolls 15 and 16 are retained in bearings housed in yoke 17, and yoke 17 is movable by piston cylinder unit 18 attached thereto. Movement of unit 18 allows rolls 15 and 16 to be displaced either further away from or closer toward finished sheet metal 6. Unit 18 is movable either hydraulically or by electrical stimulus from a control source not shown. Reversing rolls 15 and 16 are biased on opposite sides of raw sheet metal 5 to grip and move raw sheet metal 5 in accordance with rotational movement of rolls 15 and 16. As shown in FIG. 18, rolls 15 and 16 have axes of rotation which are parallel to each other. To aid movement of raw sheet metal 5, a supporting sector 19 carrying several supporting rolls 20 spaced along sector 19 and having diameters smaller than reversing rolls 15 and 16 are utilized. Supporting rolls 20 and sector 19 support raw sheet metal 5 as reversing rolls 15 and 16 draw metal 5 toward sheet metal band 2. The gradual sloping configuration of sector 19 and the numerous supporting rolls 20 substantially prevent crimping or bending of the raw metal as it is being wound onto or unwound from raw sheet metal winder 4. Furthermore, supporting sector 19 and rolls 20 gradually and precisely direct the advancing raw sheet metal 5 through reversing rolls 15 and 16 and onto a supporting path 22.

Shown in FIG. 18 is supporting path 22 formed by numerous supporting rolls 21 having axes of rotation generally parallel to each other. The upper surface of supporting path 22 defines a trough or retention means upon which sheet metal band 2 and raw sheet metal 5 or finished sheet metal 6 lie. Placed near supporting path 22 in the region of the upper roller conveyor rolls 23 is a sheet metal shunt 24 at the point in which finished sheet metal 6 and raw sheet metal 5 can be drawn to intersect each other. A piston cylinder unit 25 capable of receiving pressure from a pressure source can be swiveled either toward B or C as shown in FIG. 18. If swiveled toward B, then shunt 24 is capable of receiving raw sheet metal 5. Conversely, if swiveled toward C, then shunt 24 is capable of receiving finished sheet metal 6.

Sheet metal shunt 24 comprises an upper section 28 which, in the upper swiveling position, closes flush with the upper conveyor path 29 on which sheet metal band 2 lies. If swiveled in the lower swiveling position, B, then clearance is provided so that raw sheet metal 5 resting on supporting rolls 31 and 32 can be directed toward reversing rolls 15 and 16 and toward supporting rolls 20. Reference numeral 33 designates a shunt channel into which sheet metal band 2 can be directed in direction A and, if the finished sheet metal 6 is connected thereto, will be conveyed onto finished sheet metal winder 3.

Upper roller conveyor 23 is shown in FIG. 18 as being supported by rack 34. Supporting rolls 21 are shown supported by rack 35. Rack 35 also carries piston cylinder unit 25 via a bearing 36. Bearing 36 accommodates unit 25 such that unit 25 can be swiveled around axis 37 wherein axis 37 is parallel to swiveling axis 27.

Figure 2:
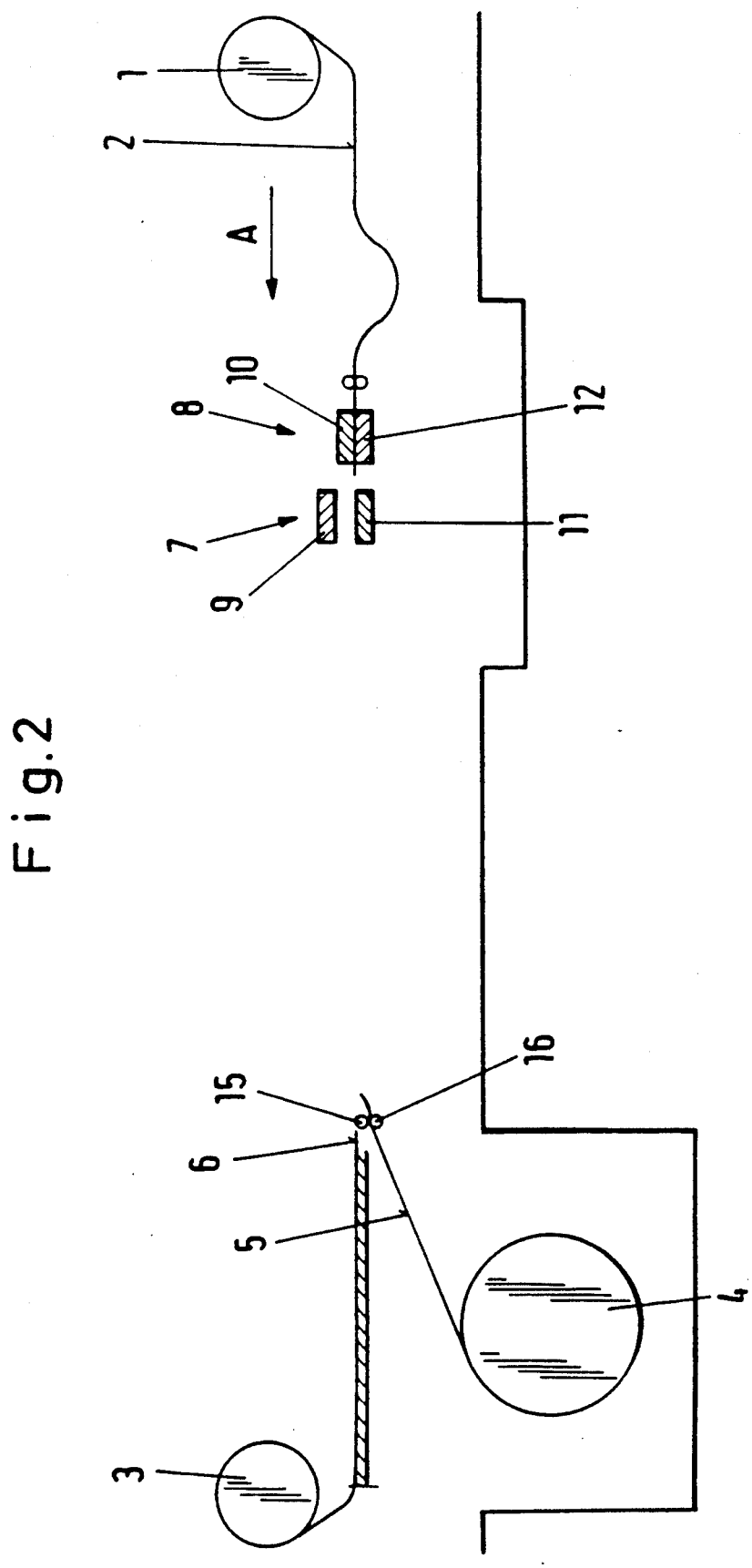
FIG. 2 is a schematic side-view of sheet metal being cut.
Figure 3:
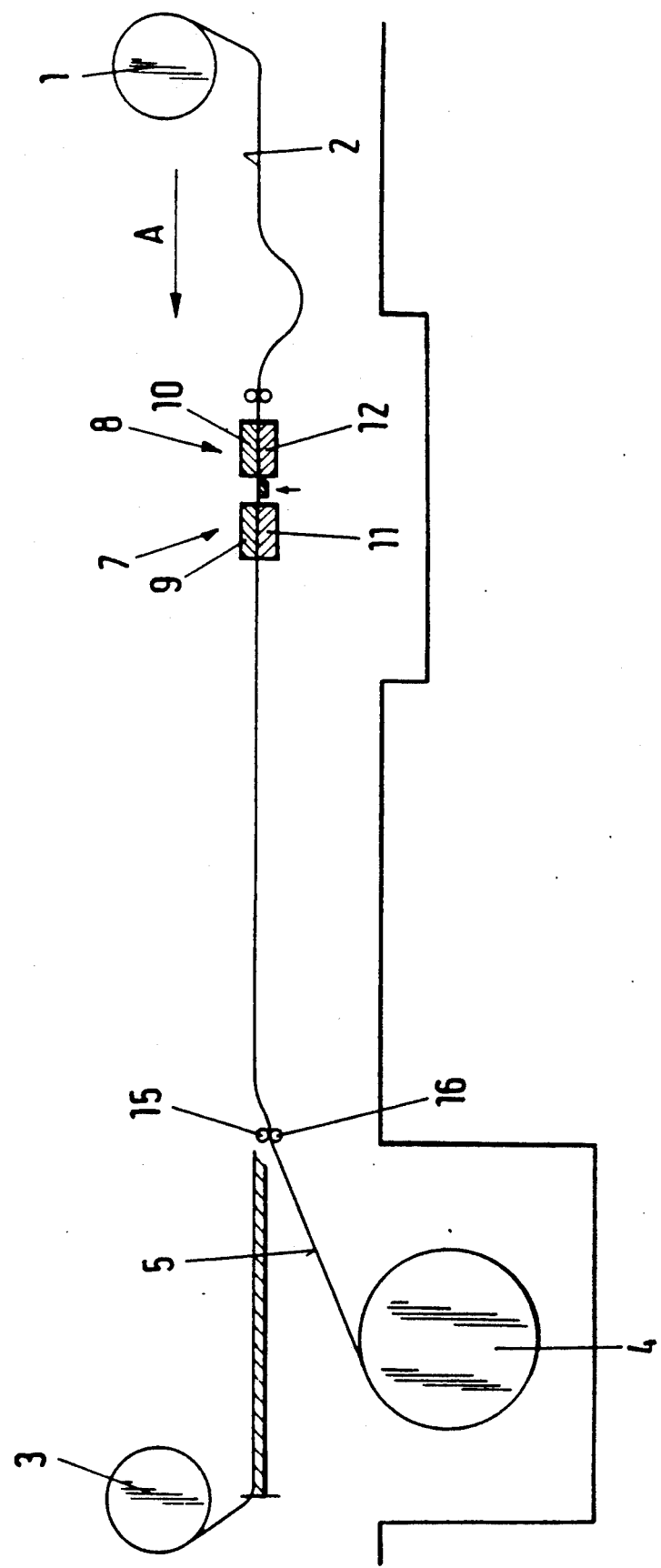
FIG. 3 is a schematic side-view of the end of raw metal sheet being advanced toward the end of sheet metal arranged on an unwinding mechanism.
Figure 4:
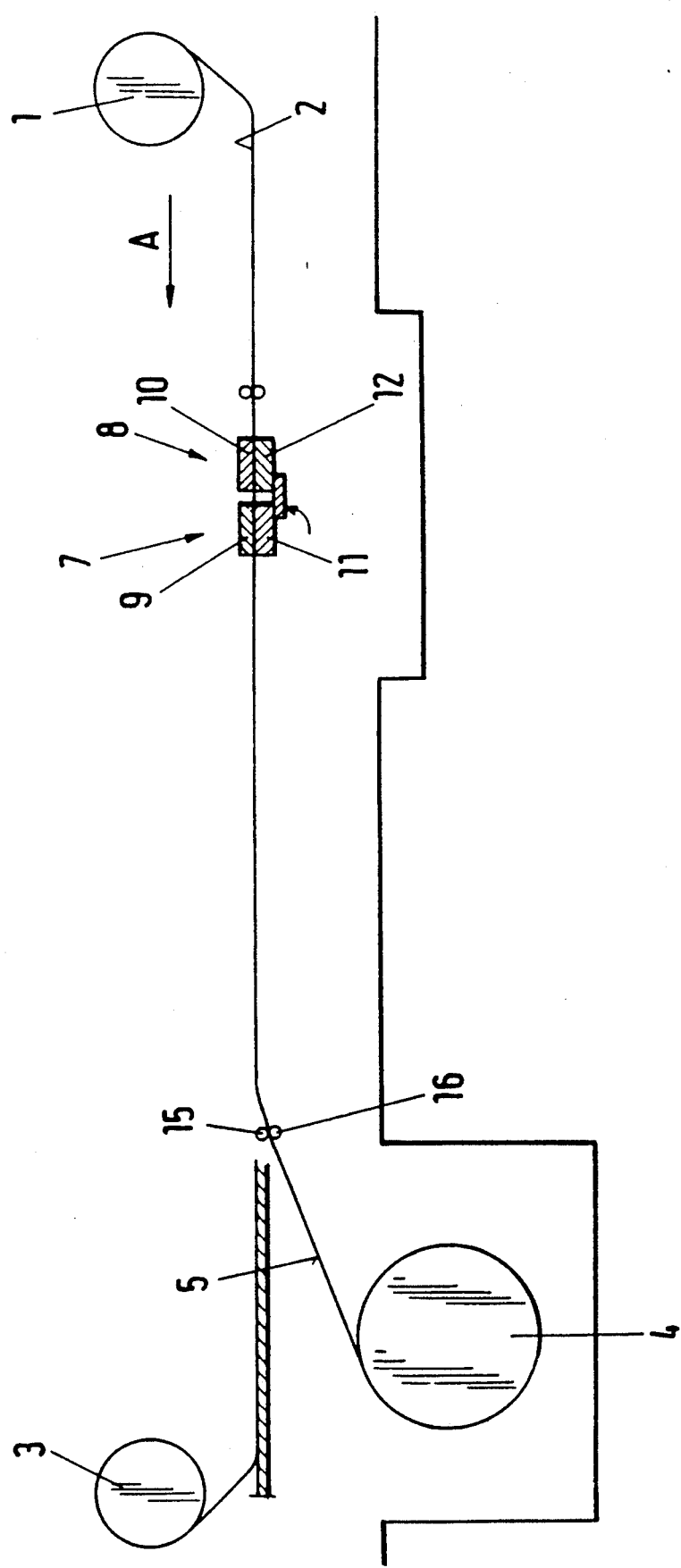
FIG. 4 is a schematic side-view of the end of the raw sheet metal being coupled to the end of the sheet metal arranged on the unwinding mechanism.
Figure 5:
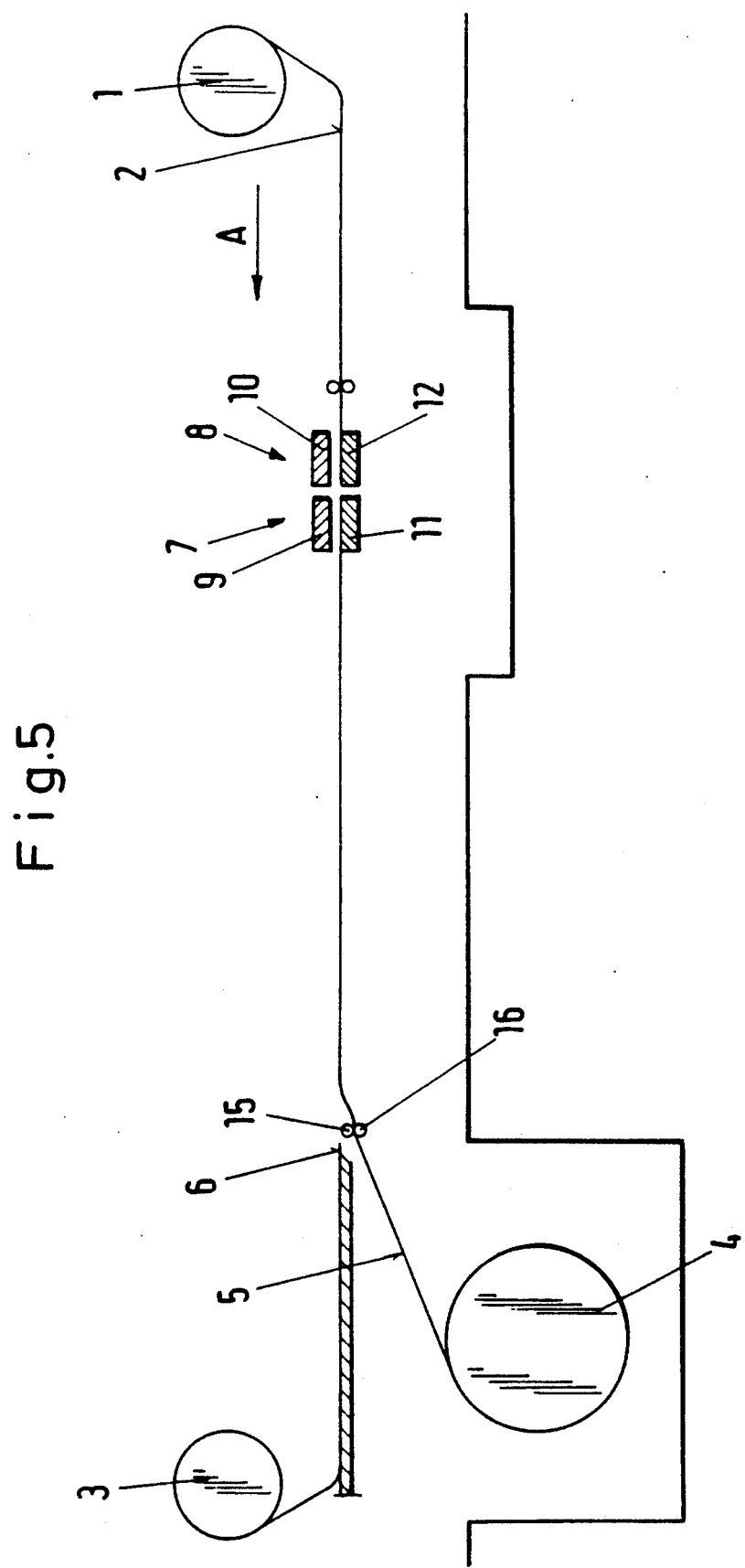
FIG. 5 is a schematic side-view of the joined sheet metal being wound onto a raw sheet metal winder.
Figure 6:
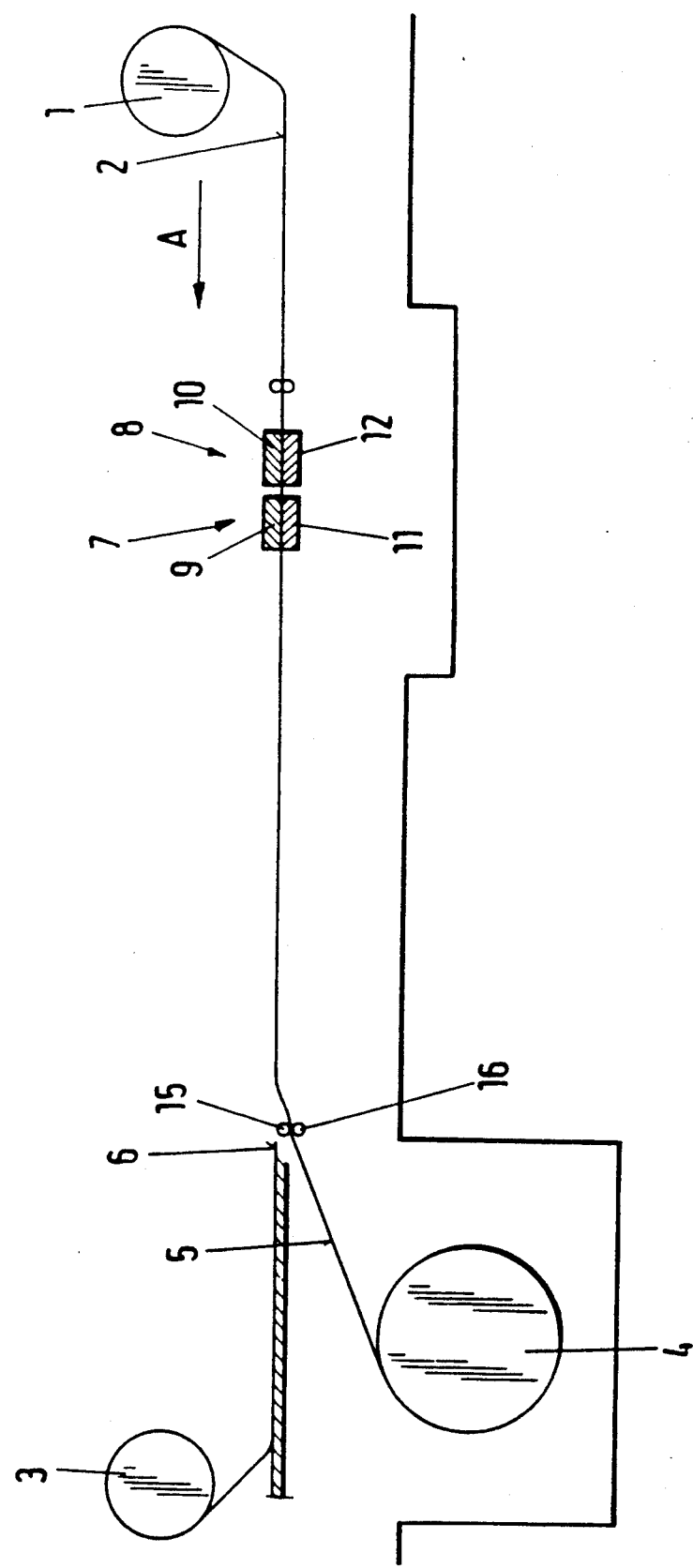
FIG. 6 is a schematic side-view of the sheet metal being clamped in stationary cutting position.

Referring to FIGS. 2–13, a method of removing target sections from band 2 and placing those sections on either raw sheet metal winder 4 or finished sheet metal winder 3 according to the present invention is disclosed. FIG. 2 illustrates releasing of jaw 7 thereby allowing one end, the first end of finished metal 6 to be withdrawn. Clamp 8 remains fixed upon the other end, the second end, of sheet metal 2. Movement of clamp 8 in a direction opposite of direction A forces a downward slight bend in sheet metal 2 as indicated in FIG. 2. Once finished metal 6 is withdrawn past shunt 24 and reversing rollers 15 and 16, raw metal 5 is advanced opposite to direction A toward the end of sheet metal 2. The end of raw metal 5 is brought in butting arrangement with the end of sheet metal by engaging clamp 7 around the third end and longitudinally moving clamp 7 toward clamp 8 as shown in FIG. 3. Clamp 8 can be drawn also toward clamp 7 to remove the bend in sheet metal 2 to allow even closer and more precise alignment between the two ends as shown in FIG. 4 just prior to the welding operation. After welding is complete, FIG. 5 illustrates that clamps 7 and 8 can be released thereby allowing winding motion of raw winder 4 to draw sheet metal 2 onto winder 4. Generally, it is preferred that clamping mechanism 7 and 8 engage sheet metal 2 at a point just prior to a target section having inappropriate thicknesses or other defects therein. Cutting sheet metal between the clamping jaws 7 and 8 just prior the target section and subsequent welding allows the target section to be redirected from finished (or raw) sheet metal to raw (or finished) sheet metal.

Figure 7:
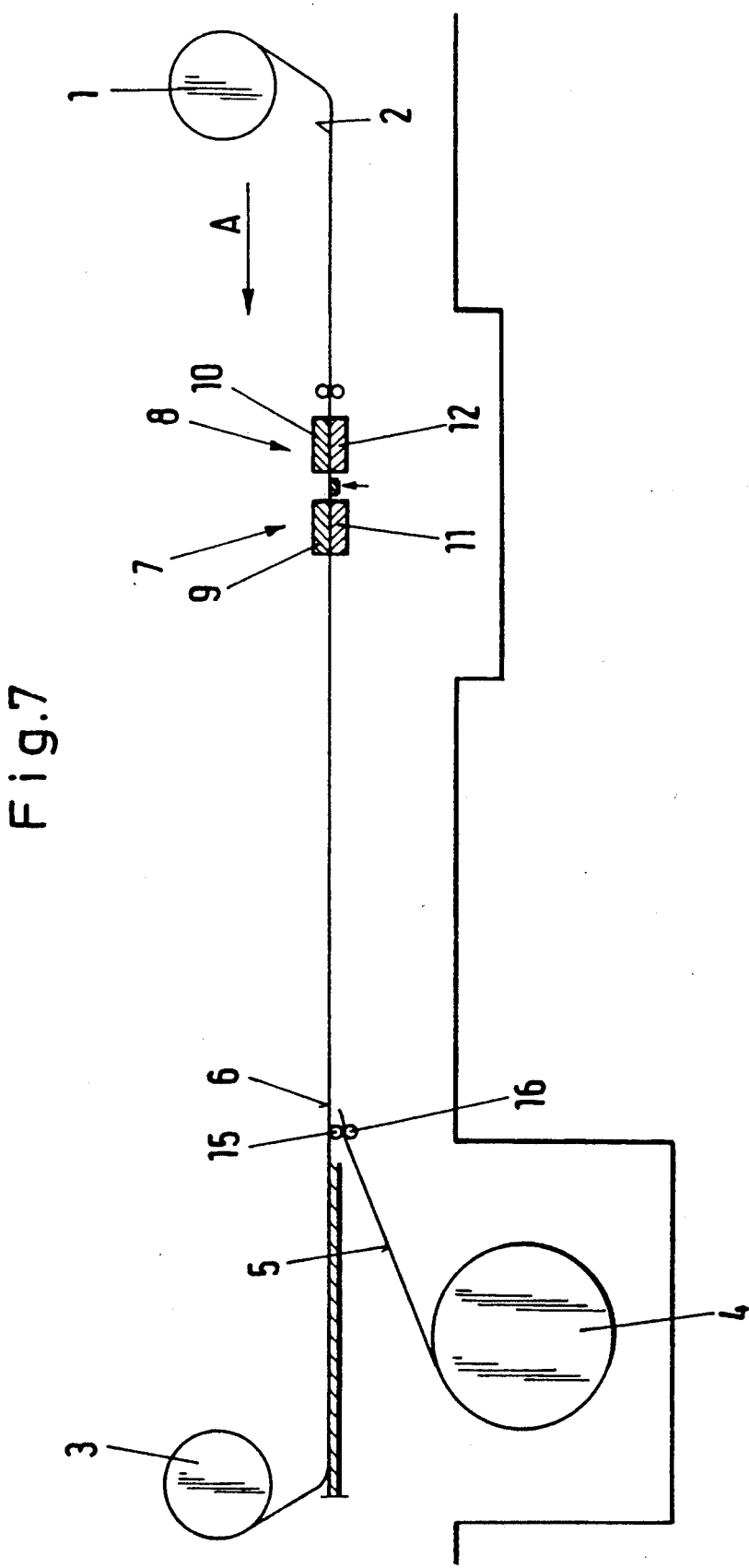
FIG. 7 is a schematic side-view of the end of the raw sheet metal drawn toward a raw sheet metal winder and the end of a finished sheet metal being advanced toward the end of the sheet metal arranged on the unwinding mechanism.
Figure 8:
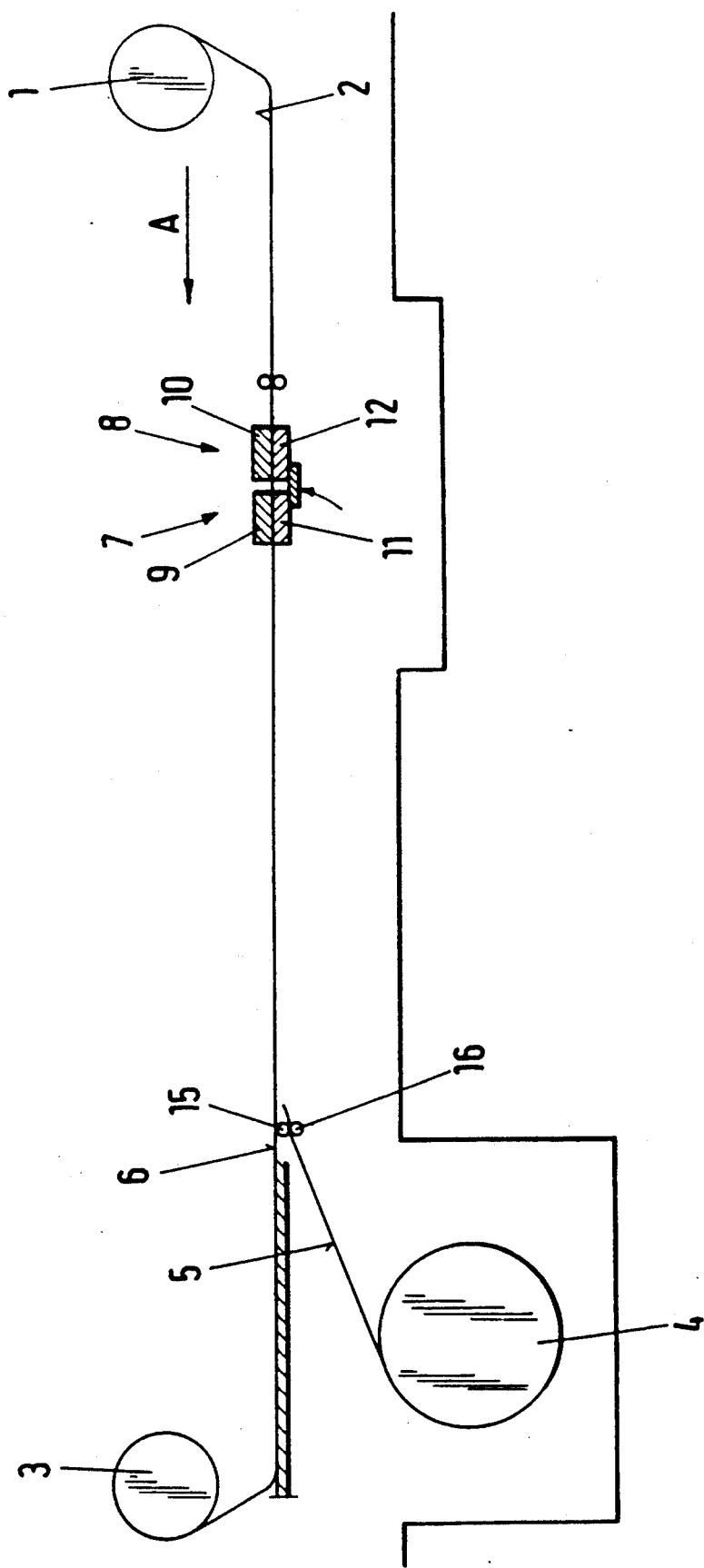
FIG. 8 is a schematic side-view of the end of the raw sheet metal being coupled to the end of the sheet metal arranged on the unwinding mechanism.
Figure 9:
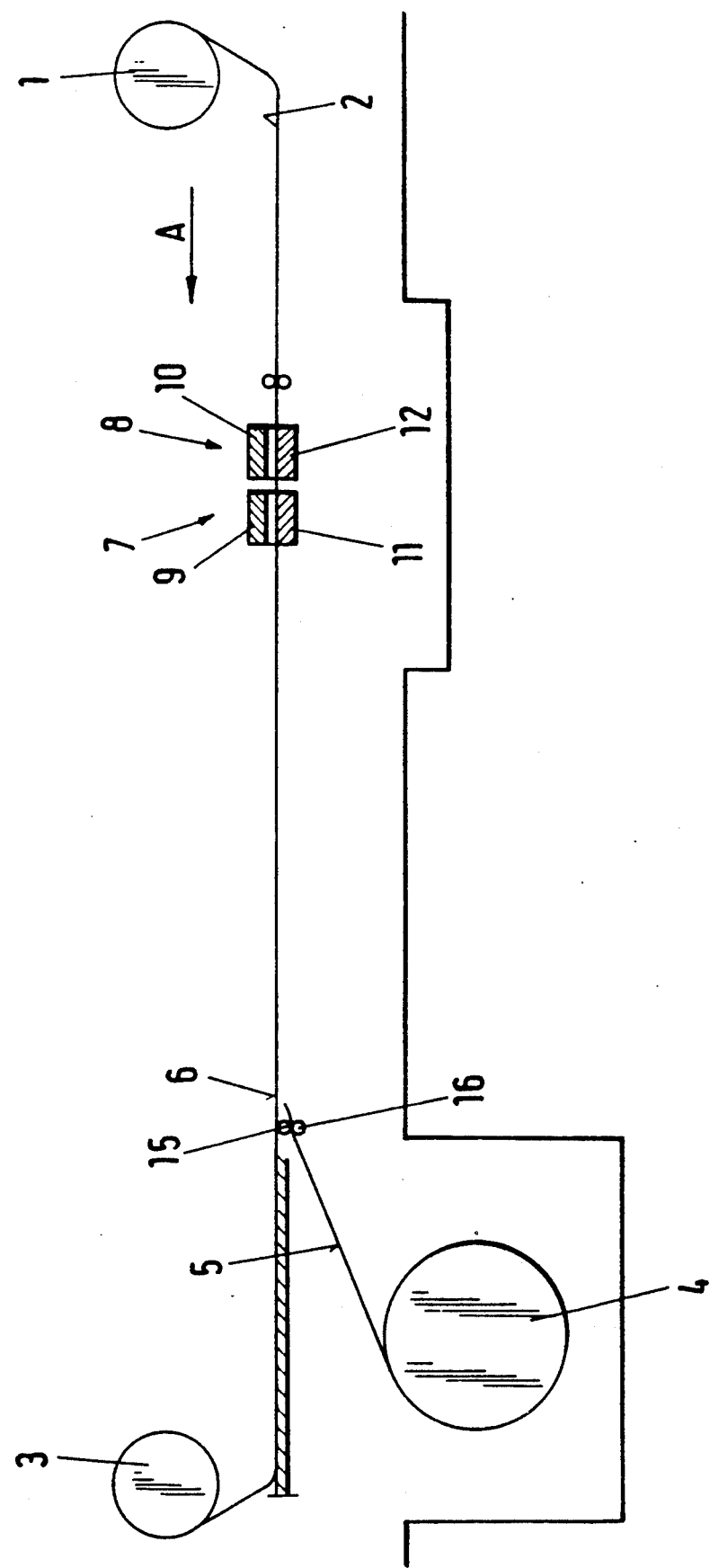
FIG. 9 is a schematic side-view of the joined sheet metal being wound onto a finished sheet metal winder.

FIGS. 6-9 illustrate the operation of the invention when sheet metal is changed from raw sheet metal winder 4 to finished sheet metal winder 3. Again, jaws 7 and 8 are engaged around the portion of the sheet metal to be cut just prior to the target section. After cutting is completed, raw sheet metal 5 is drawn onto winder 4 past shunt 24 thereby allowing advancement of finished sheet metal 6 toward the cut end of sheet metal 2. FIG. 7 illustrates the end of finished sheet metal 6 being drawn and butted against the cut end of sheet metal 2. Again, after the ends are butted, they are welded in a butt-weld technique described earlier and shown in FIG. 8. After the welding operation is completed, jaws 7 and 8 disengage thereby allowing finished winder 3 to draw the targeted finished section thereon as shown in FIG. 9. It is important to note that each time a target section (a section having defects or outside a thickness specification window or a section without defects or within a thickness specification window) occurs, a cut is made just prior to that targeted section. Defects or variations in thicknesses are sensed by any conventional camera means or sensor capable of detecting such readings. The sensor may be mounted onto the base of the present apparatus and directed toward the advancing sheet metal 2.

Figure 10:
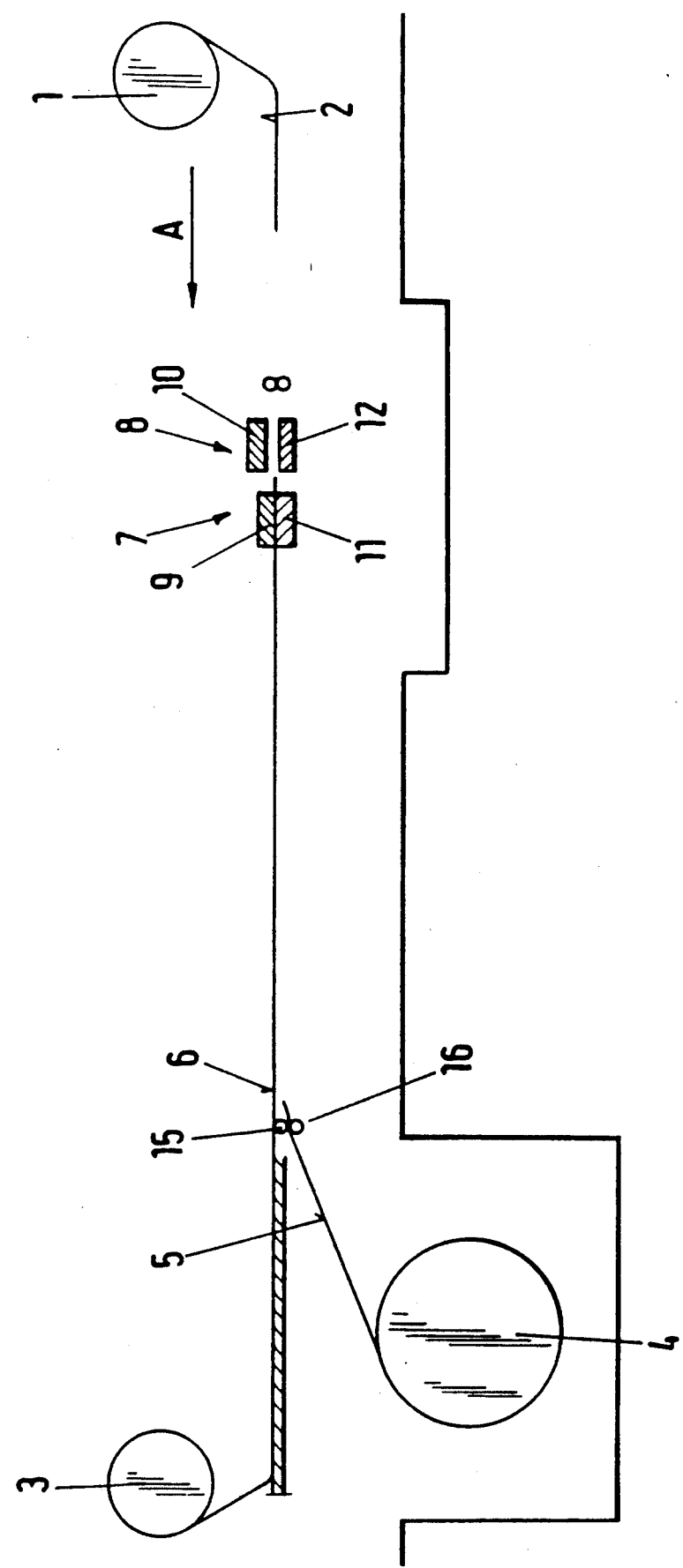
FIGS. 10, 11, 12 and 13 are schematic side-views of the different processing steps of connecting target sheet metal of the advancing coil onto finished sheet metal of the finished sheet metal winder.
Figure 11:
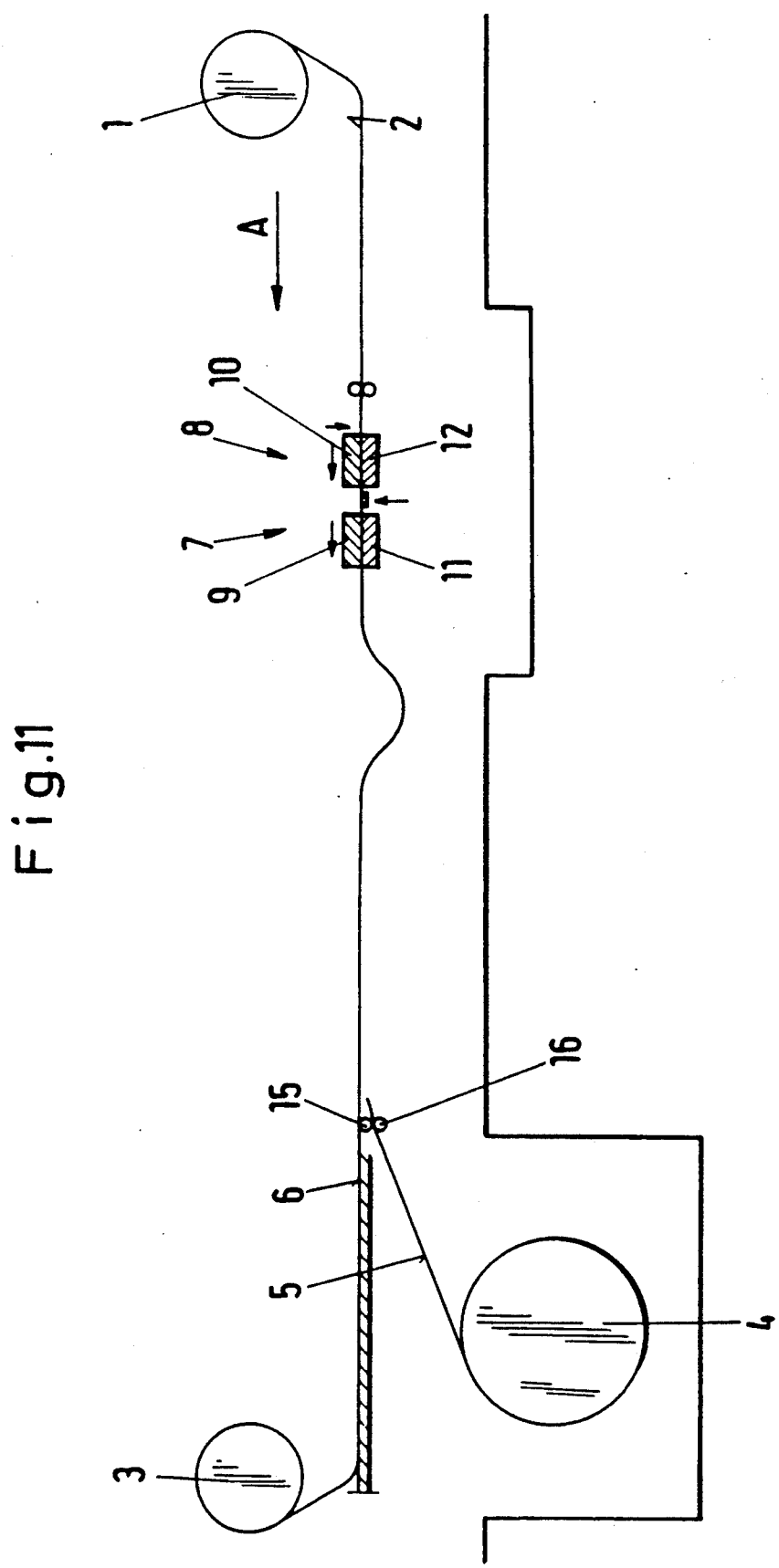
Figure 12:
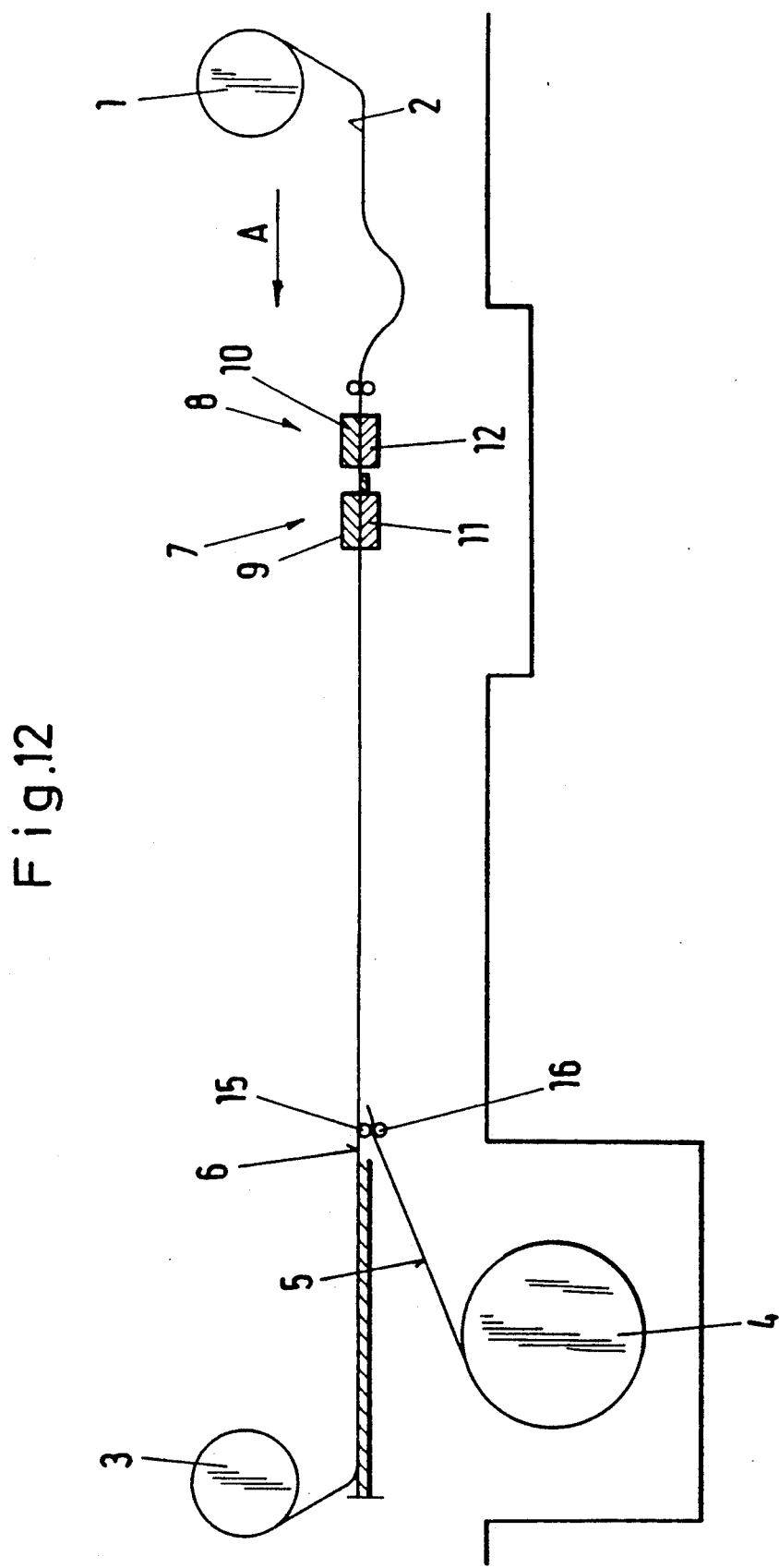
Figure 13:
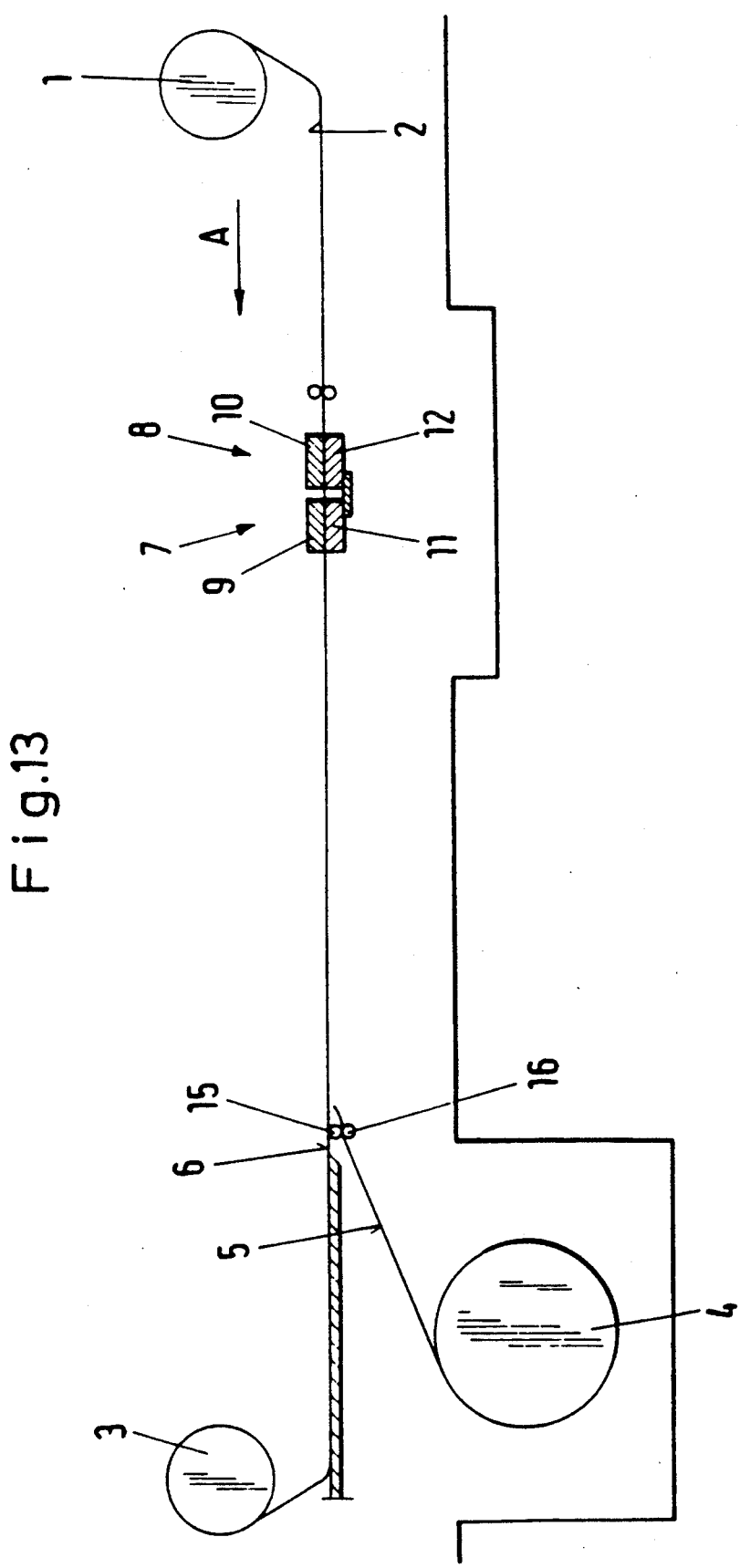

FIGS. 10-13 illustrate the steps or procedures used in connecting a continuous coil of sheet metal 2 onto an existing coil of finished sheet metal 6. Although FIGS. 10-13 assume the initial portion of sheet metal 2 is of finished product, it is important to note that if the initial region were raw material, then FIG. 10 would indicate raw sheet metal 5 being positioned to receive the initial region of sheet metal 2. If initial region is finished material, then FIG. 10 is proper in indicating finished sheet metal 6 being advanced and fixed between clamping jaw 7 so as to receive an end of drawn sheet metal 2. FIGS. 10-13 thereby illustrate the procedures used in mounting a new continuous coil of sheet metal band 2 into the present invention. Once sheet metal 2 is butted against the end of finished sheet metal 6, both clamping jaw pairs 7 and 8 can be moved in direction A thereby producing a downward bend of finished metal 6. Still further, FIG. 12 illustrates that clamping jaw pairs 7 and 8 can be moved in a direction opposite direction A to produce downward bends in sheet metal 2 while simultaneously removing the downward bend in finished sheet metal 6. Full range of movement in either direction A or opposite of direction A of both clamping pairs 7 and 8 or independent movement of each clamping pair 7 or 8 toward each other or away from each other is within the spirit and scope of this invention. Such full range of movement allows for precise alignment of the ends to be welded thereby substantially preventing seam exaggerations or buckling at the butt-welded ends.

Referring again to FIG. 18, a punching station 38 is arranged within the path of sheet metal band 2 and can be used to punch or mark a designated location on the target section of sheet band 2, if desired, by the machine operator. By punching via punching station 38, each target section can be designated and visually indicated on either raw metal winder 4 or finished metal winder 3. Therefore, if the operator wishes to punch target sections which are undesirable or which have thicknesses that vary above or below a tolerance window, the operator may wish to incorporate the punching station to punch holes or make marks in those undesirable sections to insure that they will not be used or place upon finished metal winder 3. Examining finished metal winder 3 for holes or marks provides an additional check to insure that undesirable target sections are not placed thereon.

Referring to FIG. 18a, a front view of the present invention extending from unwinding mechanism 1 to brushing station 39 is shown. Brushing station 39 is displaced along the path of sheet metal band 2 and operates to brush both sides of the sheet metal in the areas upon which welding joints or seams are located. Brushes within brushing station 39 are adjustable to draw with more or less tension against the welding joint so that more or less seam exaggeration can be removed. Generally, butt-welding of the present invention does not leave significant amounts of seam exaggeration or buckling at the weld seam. However, if there remains seam exaggeration after the welding operation, brushing station 39 operates to remove the small amount of seam exaggeration or bulge.

Reference numeral 42 denotes a trestle for supporting segment 43. Segment 43 comprises several supporting rolls 44 with parallel arranged axes of rotation. The path formed by supporting roll 44 extends from conveyor path 29 (shown in FIG. 18a) downward along a path of hingeable table 45. Table 45 is hingeable to be turned either downward or upward such that if downward turned, a sheet metal loop 85 is formed. Conversely, if turned upward such that surface 46 of table 45 is flush with conveyor path 29, sheet metal loop 85 can no longer be formed. Table 45 is provided with a steering gear 47 attached between the underneath side of table 45 and axle 48, wherein axle 48 is attached to segment 43 Similar to supporting rolls 44 are supporting rolls 50 arranged on supporting segment 49. Supporting rolls 44 and 50 have an upper surface capable of receiving downward bending sheet metal 2 as indicated in FIG. 18a. Similar to table 45 is another pivotable table 53 having an underneath side attached to steering gear 52 and axle 51. Surface 54, like surface 46, can be placed flush with the plane of conveyor path 29. The path curvatures of the front edges of tables 45 and 53 are designated by reference numerals 55 and 56 respectively.

As shown in FIG. 18a, downward hinged position of both tables 45 and 53 provide downward bending of sheet metal loop 85 if yoke 13 and/or yoke 13 and 14 are moved in direction A. Downward bending allows longitudinal control of sheet metal 2 such that when either yoke 13 or 14 is moved, there is sufficient slack or bend in sheet metal 2 to allow non-binding of the sheet metal when the ends are being butted or positioned together. Tables 45 and 53 are pivoted by a motor connected to axles 48 and 51 via electrically or hydraulically driven piston cylinder units (not shown).

Reference numeral 57 indicates a side guiding mechanism which is shown in FIGS. 16, 17 and 18a. Side guiding mechanism includes essentially two columns 58 and 59 of which column 58 is arranged on the one side and column 59 on the other side of sheet metal band 2. Arranged under conveyor path 29 is a spindle 60 which is driven by a motor 61 via a cardan shaft 62 and a clutch assembly 63. Spindle 60 can be driven in either direction thereby causing sheet metal 2 to be driven in either direction A or opposite to direction A. Also shown in FIG. 16 are reference numerals 64 and 65 as well as 66 which denote base plates upon which sheet metal 2 is placed. Furthermore, base plates 64 and 65 are adjusted either toward or away from each other to accommodate sheet metal bands 2 of varying widths. Rolls 67 and 68 are arranged on the outer perimeter of base plates 64 and 65 and engage against the outside edges of sheet metal band 2. Movement of rolls 67 and 68 allow for lateral guidance of sheet metal band 2 within base plates 64, 65, and 66. FIG. 16 further illustrates spindle 60 residing within bearings 69 and 70 formed in columns 58 and 59 respectively.

Between unwinding mechanism 1 and gripping yoke 14 are provided two column units 71 and 72 shown in FIG 18a. At their upper region are supporting rolls 73 and 74 similar to similar to supporting rolls 44 and 50 described above. Furthermore, segments 75 and 76 are also shown with hingeable cables 77 and 78, steering gears 79 and 80, and axles 81 and 82. The upwards swiveled position of tables 77 and 78 are shown by dot-dash representation, in which the surfaces 83 and 84 respectively coincide with conveyor plane 29. Downward swiveling position of tables 77 and 78 produce loop 86 similar to loop 85 discussed above. Sheet metal loop 86, similar to sheet metal loop 85, prevents resetting of tensil strengths onto sheet metal band 2 when the sheet metal band ends are moved horizontally through clamping jaw pairs 7 and 8.

All units of the present apparatus are accommodated on base 87 shown in FIG. 18aThus, yoke 17, racks 34 and 35, punching station 38, brushing 39, trestle 42, side guiding 57, gripping yokes 13 and 14 together with clamping jaw pairs 7 and 8, column units 71 and 72, etc. are all supported on base 87. Reference numerals 88 and 89 designate supports running orthogonally as well as horizontally in the continuous direction A, whereby the supports are formed on which table 90 resides. Reference numeral 91 denotes a spindle drive by which table 90 is horizontally and orthogonally adjusted to continuous direction A in both directions and is also arrestable or fixed in each position desired.

Figures 14, 15:
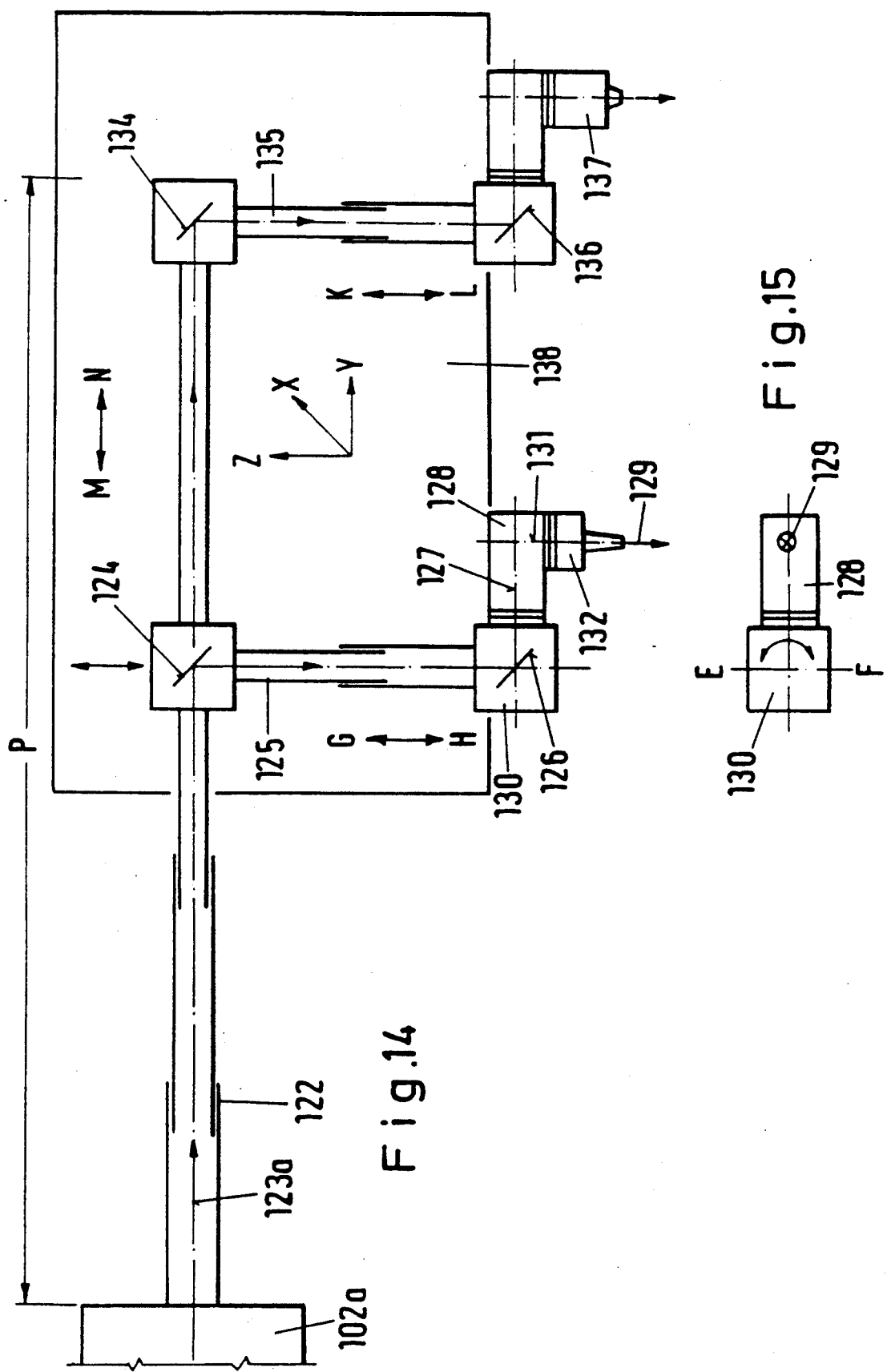
FIG. 14 is a side-view of the laser beam housing assembly and adjustment mechanism thereof.
FIG. 15 is a partial top-view of the laser beam welding device showing typical movement thereof.

A spindle drive 92 is arranged on table 90, the axial length of which is extended parallel to continuous direction A and below sheet metal band plane 29. A driving motor 93 is used to drive spindle drives 92 longitudinally along direction A or inverse of direction A. An air cylinder 97 is provided above the spindle drive 92 whereby the longitudinal axis 94 of air cylinder 97 is parallel to the longitudinal axis 95 of spindle drive 92. Cylinder 97 is connected via a pivoting gear 98 with a bearing 99 connected as an integral part of housing 100. Housing 100 is pivotally contrived around a vertical pivoting axis 101 by a limited angular amount. Air cylinder 97 also serves as a spring element for the entire housing unit consisting of gripping yoke 14, clamping jaws 10 and 12, housing 100, air cylinder 97, spindle drive 92 and table 90. Spring element or biasing means is used during the joining stroke of the ends of sheet metal band 2 and finished sheet metal 6 or raw sheet metal 5. Further, spring element also provides biasing force to prevent buckling of the ends during the joining step when the end of sheet metal 2 is joined with finished sheet metal 6 or raw sheet metal 5 fixed in clamping jaw 7. Therefore, the unit comprising gripping yoke 14, clamping jaws 10 and 12, housing 100, spindle drive 92 as well as table 90 is movably formed as a unit both in continuous direction A and opposite thereto for the purpose of forming loops 85 or 86 and also for the purpose of forming a pivoting axis of clamping jaw pairs 7 and 8 at the joining location. The total stroke of the movable unit can be independently carried out by each gripping yoke 13 together with clamping jaws 9 and 11, or gripping yoke 14 together with clamping jaws 10 and 12. The pivoting or swiveling angular region around which vertical pivoting axis 101 is restricted to that of an acute angle. Thus, the ends of sheet metal band 2 and raw sheet metal 5 or finished sheet metal 6 can be pivotally joined at the weld location to compensate for various degrees of pivotable misalignment therebetween. Furthermore, a pivotable weld can be placed at the weld seam if desired by pivoting either yoke 13 or 14 or both yoke 13 and 14 and welding the resultant clamped ends when the yokes are in the pivoted position A laser beam welding and separating device 102, shown in FIG. 15, is provided between clamping jaws 7 and 8. The laser welding and separating device may be shifted vertically and orthogonally with respect to the continuous direction A as well as horizontally along the path surface. Furthermore, the laser device can be arranged in continuous direction A and opposite thereto as well as carry out tilting and swiveling movements to achieve numerous variations in the welding joint necessary for different sheet metal thicknesses and/or configurations. The particular means by which laser welding and separation assembly can be longitudinally and pivotally moved will be described below.

Reference numerals 104 and 105 denote rolls whereby roll 104 is formed as a spring and roll 105 is relatively fixed. Spring-loaded roll 104 grippingly engages sheet metal band 2 as band 2 is fed or withdrawn into or from the clamping jaw pair 8. A pulse generator is allocated to roller pair 104 and 105 for the transfer of the resultant welding joint into brushing station 39 such that welding seam can be properly conditioned. Side guiding rolls 106 provided with vertical axes of rotation are arranged in the region of rolls 105 and 106 on each side of sheet metal band 2 for the embodiment shown in FIG. 18a. Side guiding rolls 106 can be of the same construction and arrangement as rolls 67 and 68 as described in FIGS. 16 and 17.

It is necessary, when placing a weld in the seam between the ends of cut sheet metal, that a copper-back bar be placed on the side of the seam opposite the welding laser. Copper-back bar 107 is shown in FIG. 18a as retracted or pivoted downward by retracting angle level 108 via axle 109 connected to piston cylinder unit 110. Piston cylinder 110 is actuated by hydraulic or electrical means to exert pressure onto axle lever 108 to either extend or withdraw copper-back bar 107. Piston cylinder unit 110 is connected via a pivoting axis 111 below sheet metal band 2. Copper-back bar 107 functions to closely hold and support the welding joint during welding operation such that the seam or joint does not bow or bend downward in response to gravitational forces placed thereon. Copper-back bar 107 thus maintains a smooth and straight welding seam at each welding location.

Reference numerals 112 and 113 respectively refer to conveyor devices into which either cut sheet metal rim strips are placed via channels 114 and 115. Sheet metal rim strips separated by the cutting laser from ends of sheet metal band 2 or the ends of finished sheet metal 6 and/or the ends of raw sheet metal 5. Thus, sheet metal strips are the result of portions being cut from the ends of sheet metal which do not align with the opposing fixed ends of sheet metal. The cutting or shaping of one end to match that of the other and is important in obtaining a precise and accurate fit between opposing ends so that the butt weld is of high quality and the resulting welded continuous sheet is aligned with very little seam exaggeration. Hence, sheet metal rim strips can be cut from the ends of either raw sheet metal 5 or finished sheet metal 6 thus falling into channel 114 or cut from the ends of sheet metal band 2 and falling into channel 115. Supporting portions 116 and 117 are hingeable about axes of rotation 118 and 119, respectively, to direct rim strips into their respective channels 114 and 115. Hereto, supporting portions 116 and 117 are retained with lugs 121 and 122 against a limit stop mechanism 120 such that the sheet metal strips resting on each supporting portion 116 and 117 fall into their proper allocated channel regions 114 and 115 respectively. Conveyor devices 112 and 113 are arranged underneath the opening or port of 114 and 115, respectively, to collect sheet metal rim strips and to carry away or remove the rim strips to an off-site location.

The mechanism or assembly used for moving or adjusting the cutting and welding lasers is illustrated in FIGS. 14 and 15. Reference numeral 102a designates a laser, and attached to laser 102a is a telescopic arm 123a for guiding laser beam 123 within arm 123a. Laser 102a can be, for example, Trumpf Laser TLF Model No. 1500, 2000, 2500 or 6000 made by Firma Trumpf Laserrechnik, GmbH, Ditzengen, Germany or model designations RS 1200 SM, RS 1700 SM, RS 1700 RF, RS 2500 RF, RS 3000 RF, RS 5000 RF, RS 6000 RF, RS 825, RS 840 or RS 850 available from Firma Rotin Sinar Laser GmbH, Hamburg, Germany. The choice of a specific laser depends upon the metal strip thickness, weld cycle time and desired quality Laser beam 123 impinges on a beam shunt or partially reflecting mirror 124. The resulting shunted or reflected portion of laser beam 123 passes through another telescopic arm 125 which is adjustably arranged in direction G or H. The reflected laser beam can once more be redirected or totally reflected at mirror 126 found in housing 130. The reflected beam leaving housing 130 as beam 127 arrives at welding head 128 and emerges from welding head 128 through focusing optical means 132 as a laser beam 129. Shown in FIG. 15, housing 130 together with mirror 126 and welding head 128 can be adjustably pivoted in a limited angular movement around vertical axis 131 in direction E and F. Pivotal movement E and F along with longitudinal movement G and H allow many degrees of movement freedom for exiting laser beam 129 upon sheet metal 2.

In addition, the apparatus shown in FIG. 14 is also provided with an extendable or retractable arm 133 movable in direction M or N. The portion of laser beam 123a which is not reflected but travels through beam shunt 124 thereby strikes another reflecting mirror 134. The reflected laser beam 135 passes through yet another telescopic pipe 135 and impinges upon mirror 136 and focusing optics 137. Telescopic arm 135 is longitudinally adjustable in either direction K or L as shown in FIG 14. Adjustment in either direction K or L results in adjustment in the Z-plane of welding head 137. Pivot movement around vertical axis 131 delivers adjustment within the X- and/or Y-plane of welding head 128. Welding head 128 and cutting head 137 is arranged on carrier 138 and is movable in direction M and N, respectively. In an accepted case, the measure T can, for example, vary between approximately 4.0 mm as a maximum to approximately 2.2 mm as a minimum. It is understood, however, that measure T can greatly exceed either of these exemplary maximums or minimums.

Referring to FIG. 23, welding head 128 and cutting head 137 are each adjustable in height and direction R, S with regard to sheet metal band 2. Further, adjustment of carrier 138 can be achieved through spindle drive 139. A jack-up cantilever is designated by reference numeral 142. A cable towing arrangement 143 is further shown along with bellow device 144.

As shown in FIG. 18a, gripping yoke 13 and both clamping jaws 9 and 11 are adjustable by a spindle drive 145 within a limited or restricted amount of continuous direction A and also opposite to continuous direction A. Adjustment via spindle drive 145 in the continuous direction A may cause the formation of sheet metal loop 85, whereas actuation of spindle drive 92 may cause the formation of metal loop 86. Furthermore, clamping jaws 9, 11, and 10, 12 respectively are each to be closed and opened by piston cylinder units 146 and 147, respectively. Piston cylinder units 146 and 147 are alternatively actuated by pressure or electrical means in accordance with outside stimulus. The required control lines as well as the electric and electronic construction elements, while not shown in the present drawings, are understood as part of the controlling mechanism of the present invention.

The method or function of the present invention generally involves selectively removing target sections of dissimilar sheet metal from a continuous coil of sheet metal and placing those sections in a separate continuous coil of targeted sheet metal. The targeted sheet metal may be either finished sheet metal 6 or raw sheet metal 5. If the target section is within a thickness tolerance margin and contains substantially no defects, then the target sections can be combined together to form finished sheet metal 6 placed on finished sheet metal winder 3. Conversely, if the target section has a thickness greater than or less than a preselected tolerance thickness margin and contains a substantial amount of defects, then the target sections can be combined together as raw sheet metal 5 and placed on raw sheet metal winder 4. The method for selectively removing a target section of raw sheet metal from sheet metal band 2 and placing that target section upon raw sheet metal winder 4 is shown in FIGS. 1–5. Conversely, FIGS. 6–9 indicate the removal of a target section from sheet metal band 2 and directing that section to finished sheet metal winder 3. In either case, the target section can be coupled by butt-welding to the end of finished 6 or raw sheet metal 5 by cutting the target section from the previous raw or finished sheet metal, drawing the raw or finished sheet metal past shunt 24 and reverse winding the appropriate raw or finished sheet metal through shunt 24 and toward the end of sheet metal band 2.

FIGS. 10–13 illustrate coupling of a new unwinding mechanism and sheet metal band 2 to finished sheet metal 6. It is important to note that downward bending of finished sheet metal is achieved by clamping the end of finished sheet metal with clamp pair 7 and moving clamp pair 7 in the continuous direction A. Sheet metal loop 85, shown in FIG. 18a, corresponds to the downward bend illustrated in FIG. 11. Movable clamping pairs 7 and 8 allow for precise alignment between advancing sheet metal 2 and the end of finished sheet metal 6. Furthermore, FIG. 12 illustrates that clamping pairs 7 and 8 can be moved in a direction opposite A to produce a downward bend of sheet metal band 2 corresponding to sheet metal loop 86 shown in FIG. 18a.

Broadly speaking, the present method and apparatus can change or recorrect sheet metal band coming from unwinding mechanism 1 to raw sheet metal winder 4 from finished sheet metal winder 3 if a defective target region is encountered. When a sensor placed along sheet metal band 2 path senses the target section, clamping jaws 10 and 12 clamp at the advancing side or end of sheet metal band 2 and clamping jaws 9 and 11 clamp at the discharging side or the end of finished sheet metal 6. Thereupon, cutting head 137 shown in FIG. 15 is moved over sheet metal band 2 in horizontal and orthogonal direction to the continuous direction A to cut sheet metal band 2 at a point between clamping jaw pairs 7 and 8 (see FIG. 2). Next, clamping jaws 10 and 12 remain clamped and are horizontally moved in a direction opposite that of A by actuating spindle drive mechanism 92 and forming sheet metal loop 86. To accommodate the formation of loop 86, tables 77 and 78 are hinged downward by a motor into their positions shown in FIG. 18a. Next, clamping jaws 9 and 11 are opened by electrical or hydrostatic pressure from an external electrical or pressure means from piston cylinder unit 146. Opening of jaws 9 and 11 causes finished sheet metal 6 to be removed from the defective target section by winding finished sheet metal winder 3 up to a final position 148 shown in FIG. 18. Generally, the path taken by the end of finished sheet metal 6 from clamping jaw pair 7 to position 148 can be any dimension whatsoever; however, in this embodiment, it is preferably 6 m. Furthermore, the speed by which finished sheet metal 6 is withdrawn from clamping jaw pair 7 can be any speed, however, 0.5 m/s appears suitable for this application.

Once the end of finished sheet metal 6 is withdrawn into position 148, piston cylinder unit 25 is actuated by admission of hydrostatic pressure causing sheet metal shunt 24 to be swiveled downward in position B for conveying the end of raw sheet metal 5 from its position 149 through shunt channel 32 and onto roller conveyor path 23. Thereupon, raw sheet metal 5 coming from raw sheet metal winder 4 is conveyed into clamping jaw pair 7 as shown in FIG. 3. As the end of raw sheet metal 5 is advanced through clamping jaw pair 7, a slight excess of raw sheet metal 5 extends beyond clamping jaw pair 7 toward clamping jaw pair 8. The excess can be of any length, however, it is preferred that the length be approximately 100 mm.

Clamping jaws 9 and 11 are closed onto the end of raw sheet metal 5 at the discharging cite of the laser cutting assembly, the clamping or actuation motion is caused by pressure means of piston cylinder unit 146. The excess sheet metal drawn past clamping jaws 9 and 11 allows for rim-side cutting or shaping of the end of raw sheet metal 5 to place in alignment conformity with the end of sheet metal band 2. The shaping occurs by moving cutting head 137 in the appropriate direction across the end of raw sheet metal 5 so that misaligned or unmatchable protrusions are cut and extracted. Furthermore, lateral movement of either sheet metal band 2 or raw sheet metal 5 perpendicular to their longitudinal access can take place to further assist in lateral alignment between the two ends. At least one sensor can be connected adjacent cutting head 137 to closely monitor the relationship between the ends of raw sheet metal 5 and sheet metal band 2. The sensor can be connected with feedback to and from spindle drive 91 and table 90 to provide real-time movement of raw sheet metal 5 and sheet metal band 2 with respect to each other just prior to the next step, i.e., the welding step.

Subsequently, a welding operation through use of welding head 128 and laser beam 129. The total unit, consisting of gripping yoke 14, housing 100 and table 90 is movable to carry out the welding stroke of welding head 128. Movement of gripping yoke 14, housing 100 and table 90 by spindle drive 92 in the direction A causes loop 86 to be eliminated either partially or totally in order to butt together the ends of raw sheet metal 5 and sheet metal 2 during the welding procedure. A possible angular offset can be compensated by turning the total unit, consisting of gripping yoke 14, housing 100 and cable 90 about pivoting access 101 shown in FIG. 18A. Just prior to the welding operation, back-up bar 107 is swiveled upwards underneath the seam to be welded. Finally, welding head 128 will horizontally and transversely be moved across the seam. After welding is complete, clamping jaw pairs 7 and 8 are opened allowing withdrawal of the joint target section to raw sheet metal winder 4 through a brushing station 39 and, if necessary, a punching station 38.

It is important to note that a subsequent target section detected on advancing sheet metal 2 can be cut from raw sheet metal 5 in a procedure similar to that described hereinabove and directed upon finished sheet metal winder 3 by actuating clamping jaw pairs 8, cutting just prior to the subsequent target section, withdrawing the end of raw sheet metal 5 to a position 149 and advancing the end of finished sheet metal 6 to align with and butt against the end of sheet metal band 2. Also, similar to the steps described hereinabove, butt-welding of the subsequent target section onto finished sheet metal 6 is next carried forth. Thus, the present invention incorporates a method and apparatus for selectively placing target sections upon either a raw sheet metal winder 4 or finished sheet metal winder 3 depending upon whether or not the target section is defective. The resulting raw sheet metal 5 or finished sheet metal 6 is continuous and substantially void of seem exaggerations at the welded seam.

The foregoing description of the invention has been directed to particular preferred and alternative embodiments of the present invention. It will be apparent, however, to those skilled in the art that modifications and changes in both apparatus and method may be made without departing from the scope and spirit of the invention. For example, there may be more than two winders, and, there may be more than one unwinder mechanism. Furthermore, any form of control, either electrical or mechanical, is sufficient to actuate the moving mechanisms of the present invention. The control apparatus is not shown, however, it is apparent to one of skill in the art the methodology by which the control mechanism operates. Therefore, it is the Applicants' intention in the following claims to cover all such equipment modifications and variations which fall within the true spirit and scope of this invention.

What is claimed is:

1. A method for selectively removing target sections of sheet metal from a continuous coil of sheet metal and placing those sections in a separate continuous coil of target sheet metal, comprising the steps of:

drawing said sheet metal from said coil along an elongated table and onto a first sheet metal winder;

sensing a target section of sheet metal within said drawn sheet metal;

cutting said sheet metal at a region immediately prior to said target section to produce a first end of said sheet metal attached to said first winder and a second end of said sheet metal attached to said coil;

further drawing said sheet metal onto said first winder such that said first end is partially withdrawn from said table;

providing a second sheet metal winder containing a continuous coil of target sheet metal sections and having a third end thereof;

unwinding said second sheet metal winder to advance said third end onto said table and in close alignment with said second end;

welding said second and third ends together; and winding said second sheet metal winder to draw target sheet metal from said coil of sheet metal and onto said second sheet metal winder as said continuous coil of target sheet metal.

2. The method as recited in claim 1, wherein said cutting step comprises:
   providing a moveable cutting laser;
   providing at least two clamping jaws attached to said table on opposite sides of said laser along the longitudinal axis of said sheet metal;
   closing said pair of jaws at a region immediately prior to said target region; and,
   opening at least one jaw after said cutting step to allow removal of said sheet metal onto said first winder.

3. The method as recited in claim 1, wherein said welding step comprises:
   providing a moveable welding laser;
   providing at least two clamping jaws attached to said table on opposite sides of said laser along the longitudinal axis of said sheet metal;
   closing at least one jaw onto said second end and at least one other jaw onto said third end after said unwinding step;
   placing said second and third ends in close proximity and in alignment with each other;
   pivotally placing a copper plate on one side of said second and third ends such that said second and third ends resides between said welding laser and said copper plate; and,
   opening both said clamping jaws after said welding step.

4. The method as recited in claim 3, wherein said placing step comprises moving said second or third ends toward each other along the longitudinal axis of said sheet metal.

5. The method as recited in claim 3, wherein said placing step comprises:
   moving said clamping jaws and attached second and third ends toward each other along the longitudinal axis of said sheet metal; and,
   pivoting said clamping jaws with respect to one another around an axis orthogonal to said sheet metal surface.

6. The method as recited in claim 1, wherein said unwinding step comprises:
   providing a cutting laser;
   providing a sheet metal shunt attached to said table between said laser and said first winder for extending the advancing third end toward the second end;
   shaping with said cutting laser said third end in conformity with the geometric shape and alignment of said second end; and,
   butting said second end and said shaped third end against one another and in alignment therebetween.

7. The method as recited in claim 6, wherein said shaping step comprises the steps of:
   providing spindle drives attached to said table for receiving said sheet metal and said target sheet metal;
   orthogonally and pivotally adjusting said spindle drives to longitudinally align said second and third ends;
   cutting with said cutting laser regions of the slightly extended third end which is in misalignment with said second end; and,
   removing said cut regions.

8. The method as recited in claim 7, wherein said removing step comprises a conveyor arranged underneath said cutting laser for conveying said cut regions to an off-site location.

9. The method as recited in claim 1, further comprises brushing both sides of said welding joint formed between said second and third ends to maintain uniform thickness throughout said target sheet metal.

10. The method as recited in claim 1, further comprising punching said target sheet metal during said winding step.

11. The method as recited in claim 1, further comprising the steps of:
    providing a clamping jaw;
    coupling said clamping jaw onto said second end;
    moving said jaw and coupled said second end toward said continuous coil of sheet metal to form a bend within said sheet metal prior to said unwinding step; and,
    moving said second end toward said first winder to remove said bend and align said second and third ends after said unwinding step.

12. The method as recited in claim 1, further comprising the steps of:
    providing a clamping jaw;
    coupling said clamping jaw onto said first end;
    moving said jaw and coupled said first end toward said first winder to form a bend within said target sheet metal;
    unwinding said sheet metal in butting alignment with said first end;
    welding the end of said sheet metal onto said first end; and,
    winding said first sheet metal winder to remove said bend and draw sheet metal from the continuous coil of said sheet metal.

13. A method for selectively separating, in a continuous operation, target sections from a continuous coil of original sheet metal and connecting those sections onto separate continuous coils of finished sheet metal or raw sheet metal, comprising the steps of:
    drawing said original sheet metal from said continuous coil along an elongated table and onto a first sheet metal winder containing said finished sheet metal;
    sensing a target section of original sheet metal having a thickness outside a desired thickness range;
    cutting said original sheet metal at a region immediately prior to said target section;
    drawing said finished sheet metal onto said first winder;

providing a second sheet metal winder containing a continuous coil of target sheet metal sections of raw sheet metal;

unwinding said second sheet metal winder to advance said raw sheet metal toward said original sheet metal;

welding the end of said raw sheet metal to the end of said original sheet metal;

winding said second sheet metal winder to draw target sheet metal from said coil and onto said second sheet metal winder as said continuous coil of raw sheet metal;

sensing a subsequent target section of sheet metal having a thickness within a desired thickness range; and, repeating said steps of cutting said original sheet at a region immediately before said subsequent target section, drawing said raw sheet metal onto said second winder, unwinding said first sheet metal winder to advance said finished sheet metal toward said original sheet metal, welding said finished sheet metal to said target section of original sheet metal and winding said target section onto said first sheet metal winder as said continuous coil of finished sheet metal.

14. The method as recited in claim 13, wherein said first cutting steps comprises:

providing a moveable cutting laser;

providing a first clamping jaw attached to said table adjacent to and spaced from said cutting laser in the direction of said coil;

providing a second clamping jaw attached to said table adjacent to and spaced from said cutting laser on an opposite side of said cutting laser from said first clamping jaw;

closing said first and second jaws upon said sheet metal, prior to said cutting step, at a region immediately prior to said targeted section; and, opening said second jaw after each said cutting step.

15. The method as recited in claim 13, wherein said first welding step comprises:

providing a moveable welding laser;

providing a first clamping jaw attached to said table adjacent to and spaced from said welding laser in the direction of the coil of said original sheet metal;

providing a second clamping jaw attached to said table adjacent to and spaced from said welding laser on an opposite side of said welding laser from said first clamping jaw;

closing said first jaw onto the end of said original sheet metal;

closing said second jaw onto the end of said raw sheet metal after said first unwinding step;

placing the ends of said original and said raw sheet metals in close proximity and in alignment with each other;

pivotally placing a copper plate on one side of the ends of said original and raw sheet metals such that the ends of said original and raw sheet metals reside between said welding laser and said copper plate; and, opening both said first and second jaws after said first welding step.

16. The method as recited in claim 13, wherein said second welding step comprises:

providing a moveable welding laser;

providing a first clamping jaw attached to said table adjacent to and spaced from said welding laser in the direction of the coil of said original sheet metal;

providing a second clamping jaw attached to said table adjacent to and spaced from said welding laser on an opposite side of said welding laser from said first clamping jaw;

closing said first jaw onto the end of said original sheet metal;

closing said second jaw onto the end of said finished sheet metal after said second unwinding step;

placing the ends of said original and said finished sheet metals in close proximity and in alignment with each other;

pivotally placing a copper plate on one side of the ends of said original and finished sheet metals such that the ends of said original and finished sheet metals reside between said welding laser and said copper plate; and, opening both said first and second jaws after said second welding step.

17. The method as recited in claim 15 or 16, wherein said placing step comprises moving said first and second jaws and attached ends toward each other along the longitudinal axis in pivotal and longitudinal alignment with said original sheet metal.

18. The method as recited in claim 13, wherein said first unwinding step comprises:

providing a cutting laser;

providing a clamping jaw attached to said table adjacent said laser and spaced from said laser in the direction of said first winder;

providing a sheet metal shunt attached to said table between said laser and said first winder for extending the advancing said raw sheet metal toward said original sheet metal and into and slightly beyond said jaw;

closing said jaw;

sensing the geometric shape and alignment of the end of said original sheet metal;

shaping with said cutting laser the slightly extended end of said raw sheet metal in conformity with the geometric shape and alignment of the end of said original sheet metal; and, butting the ends of said raw sheet metal and original sheet metal against one another and in alignment therebetween.

19. The method as recited in claim 13, wherein said second unwinding step comprises:

providing a cutting laser;

providing a clamping jaw attached to said table adjacent said laser and spaced from said laser in the direction of said first winder;

providing a sheet metal shunt attached to said table between said laser and said first winder for extending the advancing said finished sheet metal toward said original sheet metal and into and slightly beyond said jaw;

closing said jaw;

sensing the geometric shape and alignment of the end of said original sheet metal;

shaping with said cutting laser the slightly extended end of said finished sheet metal in conformity with the geometric shape and alignment of the end of said original sheet metal; and, butting the ends of said finished sheet metal and original sheet metal against one another and in alignment therebetween.

20. A method for selectively separating target sections from an original continuous coil of sheet metal and connecting those sections onto either separate continuous coils of finished sheet metal or raw sheet metal, comprising the steps of:

providing a cutting and welding laser;

drawing said sheet metal from said original continuous coil along an elongated table and onto a first sheet metal winder containing said finished sheet metal;

providing a shunt mechanism attached to said table and along said sheet metal path between said laser and said first sheet metal winder;

sensing a target section of sheet metal having a thickness outside a desired thickness range;

cutting with said cutting laser said sheet metal orthogonal to the longitudinal axis of said sheet metal at a region immediately prior to said target section to produce a first end of said finished sheet metal attached to said first winder and a second end of said sheet metal attached to said original coil;

further drawing said finished sheet metal onto said first winder such that said first end is partially withdrawn from said table and past said shunt mechanism;

providing a second sheet metal winder displaced from the longitudinal axis of said finished sheet metal and containing a continuous coil of target sheet metal section and having a third end thereof;

unwinding said second sheet metal winder to advance said third end toward said original coil past said shunt mechanism and in longitudinal and pivotal alignment with said second end;

fixing said third end and said second end in close proximity to each other;

welding said second end and said third end together with said welding laser;

winding said second sheet metal winder to draw said target sheet metal from said coil and onto said second sheet metal winder as said continuous coil of raw sheet metal;

sensing a subsequent target section of sheet metal having a thickness within a desired thickness range;

cutting with said cutting laser said sheet metal orthogonal to the longitudinal axis of said sheet metal at a point immediately prior to said subsequent target section to produce a fourth end of said raw sheet metal attached to said second winder and a fifth end of said sheet metal attached to said original coil;

further drawing said raw sheet metal onto said second winder such that said fourth end is partially withdrawn from said table and past said shunt mechanism;

unwinding said first sheet metal winder to advance said first end toward said original coil past said shunt mechanism and in longitudinal and pivotal alignment with said fifth end;

fixing said first end and said fifth end in close proximity to each other;

welding said first end and said fifth end together with said welding laser;

winding said first sheet metal winder to draw said subsequent target sheet metal from said coil and onto said first sheet metal winder as said continuous coil of finished sheet metal; and, repeating the above steps.

21. An apparatus for selectively separating target sections from a continuous coil of original sheet metal and connecting those sections onto separate continuous coils of target sheet metal, comprising:

an original coil containing said original sheet metal;

an elongated table spaced from said original coil for receiving said sheet metal drawn from said coil;

a pair of clamping jaws attached to said table and capable of clamping onto said drawn sheet metal;

a sensor displaced along said table for detecting target sections within said drawn sheet metal;

means mounted on said table between said pair of jaws for cutting said sheet metal immediately prior to said target section;

first winder means spaced from said original coil for drawing said cut sheet metal;

a second winder spaced from said original coil and said first winder and containing said continuous target sections;

means mounted on said table between said clamping jaws for joining said continuous target sections to the detected target section on said original sheet metal; and, means for winding upon said second winder said detected target section.

22. The apparatus for selectively separating target sections as recited in claim 21, wherein said cutting and joining means comprises a laser.

23. The apparatus as recited in claim 21, wherein said cutting means comprises a laser moveable in an orthogonal direction with respect to the longitudinal axis of said sheet metal.

24. The apparatus as recited in claim 21, wherein said joining means comprises a laser pivotable around an axis which is orthogonal to the horizontal plane of said sheet metal.

25. The apparatus as recited in claim 21, wherein each said clamping jaw comprises means for moving said one clamping jaw toward the other jaw.

26. The apparatus as recited in claim 21, wherein each said clamping jaw comprises means for moving said one clamping jaw away from the other jaw.

27. The apparatus as recited in claim 26, wherein said table comprises a supporting trough means pivotable about a horizontal axis orthogonal to the longitudinal axis of said sheet metal for receiving downward bending of said sheet metal in response to away movement of said clamping jaws.

28. The apparatus as recited in claim 21, further comprises means for shaping the end of said continuous target sections to match the end of said detected target section.

29. The apparatus as recited in claim 28, wherein said shaping means includes a laser directed upon the end of said continuous target sections.

30. The apparatus as recited in claim 21, further comprising shunting means mounted on said table between said cutting means and said first winder, between said joining means and said second winder for directing continuous target sections to the detected target sections on said original sheet metal.

31. The apparatus as recited in claim 21, further comprising lateral guiding rollers spaced along said table moveable to laterally adjust the longitudinal alignment of said sheet metal and to accommodate sheet metal of differing widths.

32. The apparatus as recited in claim 21, further comprising brushes spaced along said table on both sides of said sheet metal between said cutting means and said first winder, between said joining means and said second winder.

* * * * *